United States Patent
Saloway et al.

(10) Patent No.: US 9,551,278 B2
(45) Date of Patent: Jan. 24, 2017

(54) HYDROGEN PRODUCTION SYSTEM AND PROCESS

(71) Applicant: AIR PRODUCTS AND CHEMICALS, INC., Allentown, PA (US)

(72) Inventors: Simon Craig Saloway, Weybridge (GB); David George DeMaria, Perkasie, PA (US); David Anthony Zagnoli, Macungie, PA (US); Russell Ira Snyder, III, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 372 days.

(21) Appl. No.: 14/332,784

(22) Filed: Jul. 16, 2014

(65) Prior Publication Data

US 2016/0017802 A1 Jan. 21, 2016

(51) Int. Cl.

| | | |
|---|---|---|
| *C01B 3/38* | (2006.01) | |
| *C01B 3/26* | (2006.01) | |
| *C01B 3/02* | (2006.01) | |
| *F02C 6/10* | (2006.01) | |
| *F02C 6/18* | (2006.01) | |
| *H01M 8/06* | (2016.01) | |

(52) U.S. Cl.
CPC . *F02C 6/10* (2013.01); *F02C 6/18* (2013.01); *C01B 2203/0227* (2013.01); *C01B 2203/0233* (2013.01); *C01B 2203/142* (2013.01); *C01B 2203/169* (2013.01); *H01M 8/0618* (2013.01); *Y02E 20/14* (2013.01); *Y02P 20/132* (2015.11)

(58) Field of Classification Search
CPC ........... C01B 2203/0227; C01B 2203/0233; C01B 2203/169; C01B 2203/142; Y02P 20/132; H01M 8/0618; F02C 3/22; F02C 6/10; F02C 6/18
See application file for complete search history.

(56) References Cited

U.S. PATENT DOCUMENTS

| | | | |
|---|---|---|---|
| 6,497,856 B1 * | 12/2002 | Lomax, Jr. ............. | B01J 8/0005 252/373 |
| 7,043,923 B2 | 5/2006 | Ahmed et al. | |
| 7,076,957 B2 * | 7/2006 | Ahmed ................... | C01B 3/384 60/39.12 |

(Continued)

FOREIGN PATENT DOCUMENTS

| | | |
|---|---|---|
| EP | 2487348 | 8/2012 |
| WO | 2009/155554 A2 | 12/2009 |

OTHER PUBLICATIONS

Peltier, Robert, "Port Arthur II Integrated Hydrogen/Cogeneration Facility, Port Arthur, Texas," Power Magazine, http://www.powermag.com/port-arthur-ii-integrated-hydrogencogeneration-facility-port-arthur-texas/, Sep. 15, 2007.

(Continued)

*Primary Examiner* — Justin Larson
(74) *Attorney, Agent, or Firm* — Bryan C. Hoke, Jr.

(57) ABSTRACT

Hydrogen production process and apparatus using a combined stream of gas turbine exhaust from a gas turbine and combustion air from forced draft fan as combustion oxidant in a steam reforming furnace. A valve assembly for providing draft air is included to quickly provide additional combustion air to the reformer furnace when the gas turbine unexpectedly shuts down.

16 Claims, 2 Drawing Sheets

(56) References Cited

U.S. PATENT DOCUMENTS

| | | | |
|---|---|---|---|
| 7,096,672 B1 * | 8/2006 | Ahmed | C01B 3/384 |
| | | | 60/780 |
| 7,114,322 B2 | 10/2006 | Yamanaka et al. | |
| 7,467,519 B2 | 12/2008 | Raybold et al. | |
| 7,827,804 B2 | 11/2010 | De Koeijer et al. | |
| 7,931,888 B2 * | 4/2011 | Drnevich | C01B 3/16 |
| | | | 423/650 |
| 7,989,509 B2 * | 8/2011 | Allam | C01B 3/382 |
| | | | 518/700 |
| 8,889,037 B2 * | 11/2014 | Singh | C01B 3/025 |
| | | | 252/373 |
| 9,132,402 B2 * | 9/2015 | Singh | B01J 8/04 |
| 9,252,443 B2 * | 2/2016 | Kani | C01B 3/384 |
| 9,283,536 B2 * | 3/2016 | Allam | C01B 3/36 |
| 9,327,972 B2 * | 5/2016 | Allam | C01B 3/382 |
| 9,352,296 B2 * | 5/2016 | Chakravarti | C01B 3/26 |
| 9,365,131 B2 * | 6/2016 | Jamal | H01M 8/0618 |
| 2003/0110693 A1 | 6/2003 | Drnevich | |
| 2005/0050894 A1 | 3/2005 | Ahmed et al. | |
| 2009/0165377 A1 * | 7/2009 | Koh | C01B 3/34 |
| | | | 48/76 |
| 2009/0241551 A1 | 10/2009 | Grover | |
| 2015/0110684 A1 * | 4/2015 | Allam | C01B 3/36 |
| | | | 422/187 |
| 2016/0083251 A1 * | 3/2016 | Edlund | C01B 3/32 |
| | | | 423/648.1 |
| 2016/0130515 A1 * | 5/2016 | Edlund | C10L 3/08 |
| | | | 422/162 |
| 2016/0240877 A1 * | 8/2016 | Jamal | H01M 8/0618 |

OTHER PUBLICATIONS

Baade, et al., "Consider using hydrogen plants to cogenerate power needs," hydrocarbon processing, http://www.hydrocarbonprocessing.com/Article/2600867/Consider-using-hydrogen-plants-to-cogenerate-power-needs.html, Dec. 1, 1999.

\* cited by examiner

HYDROGEN PRODUCTION SYSTEM AND PROCESS

BACKGROUND

Gas turbines are often required to generate electrical power for new industrial plants, or expansion to existing industrial operating plants. On-site generated electrical power may be used to supplement or used in lieu of power from the local electrical operating grid.

Integrated hydrogen production facilities that cogenerate electricity and sometimes also steam are known. For example, Air Products operates an integrated hydrogen/cogeneration facility in Port Arthur, Tex., as described in the article by Robert Peltier, "Port Arthur II Integrated Hydrogen/Cogeneration Facility, Port Arthur, Texas", in POWER Magazine, 09/15/2007, available online at http://www.powermag.com/port-arthur-ii-integrated-hydrogencogeneration-facility-port-arthur-texas/. At this facility, gas turbine exhaust is divided, with a portion going to a heat recovery steam generator as combustion oxidant where steam is produced, and second portion going to a steam methane reformer as combustion oxidant.

In an earlier publication, Terrible et al. disclose the combination of a gas turbine with a steam methane reformer in the article "Consider using hydrogen plants to cogenerate power needs," in *Hydrocarbon Processing*, December 1999. In this article, an embodiment is disclosed where exhaust from a gas turbine enters the radiant section of the reformer. The article states that at 538° C., the gas turbine exhaust still contains 13% oxygen and serves as combustion air to the reformer and that since this stream is hot, reformer fuel consumption is decreased.

Industry desires efficient systems and processes for producing hydrogen and coproducing electrical power.

Industry desires to utilize heat from the exhaust of a gas turbine for improved energy efficiency.

Industry desires reliable operation of hydrogen production systems and processes that are integrated with gas turbines, particularly when the gas turbine unexpectedly shuts down.

BRIEF SUMMARY

The present invention relates to a facility and process for producing a $H_2$-containing product. There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. An apparatus for producing a $H_2$-containing product, the apparatus comprising:
 a gas turbine (10) having an outlet for withdrawing an exhaust stream (12) from the gas turbine (10);
 a forced draft fan (20) having an outlet for discharging an oxidant stream (21);
 a valve assembly (25) for providing a draft air stream (27); and
 a reformer furnace (30) operatively connected to the gas turbine (10), the forced draft fan (20), and the valve assembly (25), and operatively disposed to receive at least a portion (19) of the exhaust stream (12) from the gas turbine (10), at least a portion of the oxidant stream (21) from the forced draft fan (20), and the draft air stream (27) from the valve assembly (25).

Aspect 2. The apparatus of aspect 1 further comprising:
 a second forced draft fan (60) having an outlet for discharging a second oxidant stream (61);
 a second valve assembly (65) for providing a second draft air stream (67); and
 a second reformer furnace (70) operatively connected to the gas turbine (10), the second forced draft fan (60), and the second valve assembly (65), and operatively disposed to receive a second portion (59) of the exhaust stream (12) from the gas turbine (10), at least a portion of the second oxidant stream (61) from the second forced draft fan (60), and the second draft air stream (67) from the second valve assembly (65).

Aspect 3. The apparatus of aspect 1 or aspect 2 wherein the reformer furnace (30) comprises a plurality of catalyst-containing reformer tubes wherein the plurality of catalyst-containing reformer tubes are operatively disposed to receive a reformer feed gas stream (34) and the reformer furnace is operatively disposed to receive the at least a portion (19) of the exhaust stream (12), the at least a portion of the oxidant stream (21), the draft air stream (27), and a fuel stream (32) for combustion thereof in a combustion space external to the plurality of catalyst-containing reformer tubes, wherein the reformer furnace has a first outlet for withdrawing a reformate stream (36) formed from the reformer feed gas stream (34) in the plurality of catalyst-containing reformer tubes, and wherein the reformer furnace (30) has a second outlet for withdrawing a combustion product gas stream (38) from the combustion space, the combustion product gas stream (38) formed by the combustion of the fuel stream (32).

Aspect 4. The apparatus of aspect 2 or aspect 3 wherein the second reformer furnace (70) comprises a plurality of catalyst-containing reformer tubes wherein the plurality of catalyst-containing reformer tubes of the second reformer furnace (70) are operatively disposed to receive a second reformer feed gas stream (74) and the second reformer furnace is operatively disposed to receive the second portion (59) of the exhaust stream (12), the at least a portion of the second oxidant stream (61), the second draft air stream (67), and a second fuel stream (72) for combustion thereof in a combustion space external to the plurality of catalyst-containing reformer tubes of the second reformer furnace (70), wherein the second reformer furnace (70) has a first outlet for withdrawing a second reformate stream (76) formed from the second reformer feed gas stream (74) in the plurality of catalyst-containing reformer tubes of the second reformer furnace (70), and wherein the second reformer furnace has a second outlet for withdrawing a second combustion product gas stream from the combustion space of the second reformer furnace (70), the second combustion product gas stream formed by the combustion of the second fuel stream (72).

Aspect 5. The apparatus of any one of aspects 1 to 4 further comprising:
 a heat exchanger (22) operatively disposed between the forced draft fan (20) and the reformer furnace (30), wherein the heat exchanger (22) is operatively disposed to receive the at least a portion of the oxidant stream (21) from the forced draft fan (20), and the reformer furnace (30) is operatively disposed to receive the at least a portion of the oxidant stream (21) from the heat exchanger (22).

Aspect 6. The apparatus of aspect 5 wherein the heat exchanger (22) is operatively disposed to provide indirect heat transfer between the at least a portion of the oxidant stream (21) and at least one of a portion or all of a/the combustion product gas stream (38) from the reformer furnace (30) and a portion or all of a/the reformate stream (36) from the plurality of catalyst-containing reformer tubes of the reformer furnace (30).

Aspect 7. The apparatus of any one of aspects 2 to 6 further comprising:
   a second heat exchanger (62) operatively disposed between the second forced draft fan (60) and the second reformer furnace (70), wherein the second heat exchanger (62) is operatively disposed to receive the at least a portion of the second oxidant stream (61) from the second forced draft fan (60), and the second reformer furnace (70) is operatively disposed to receive the at least a portion of the second oxidant stream (61) from the second heat exchanger (62).

Aspect 8. The apparatus of aspect 7 wherein the second heat exchanger (62) is operatively disposed to provide indirect heat transfer between the at least a portion of the second oxidant stream (61) and at least one of a portion or all of a/the second combustion product gas stream (78) from the second reformer furnace (70) and a portion or all of a/the second reformate stream (76) from the plurality of catalyst-containing reformer tubes of the second reformer furnace (70).

Aspect 9. The apparatus of any one of aspects 1 to 8 further comprising:
   an induced draft fan (50) operatively disposed to receive a/the combustion product gas stream (38) from the reformer furnace (30).

Aspect 10. The apparatus of any one of aspects 2 to 9 further comprising:
   a second induced draft fan (90) operatively disposed to receive a/the second combustion product gas stream (78) from the second reformer furnace (70).

Aspect 11. The apparatus of any one of aspects 1 to 10 wherein the valve assembly (25) is suitable for discharging a blended oxidant stream (26) comprising at least a portion of the oxidant stream (21) and at least a portion of the exhaust stream (12) from the gas turbine (10).

Aspect 12. The apparatus of any one of aspects 2 to 11 wherein the second valve assembly (65) is suitable for discharging a second blended oxidant stream (66) comprising at least a portion of the second oxidant stream (61) and a portion or all of the second portion (59) of the exhaust stream (12) from the gas turbine (10).

Aspect 13. The apparatus of any one of aspects 1 to 12 further comprising:
   a valve assembly (15) for controlling the exhaust stream (12) from the gas turbine (10), the valve assembly (15) operative to control the flow rate of the at least a portion (19) of the exhaust stream (12).

Aspect 14. The apparatus of aspect 13 wherein the valve assembly (15) for controlling the exhaust stream (12) from the gas turbine (10) is further operative to control the flow rate of a/the second portion (59) of the exhaust stream.

Aspect 15. The apparatus of aspect 13 or aspect 14 further comprising:
   a gas turbine exhaust vent (17) operatively disposed to selectively receive a portion or all of the exhaust stream (12) from the gas turbine (10) via the valve assembly (15) for controlling the exhaust stream (12) wherein the valve assembly (15) for controlling the exhaust stream (12) is further operative to selectively divert at least a portion of the exhaust stream (12) to the gas turbine exhaust vent (17).

Aspect 16. The apparatus of any one of aspects 1 to 15 further comprising:
   a conduit (16) operatively disposed to transport the at least a portion (19) of the exhaust stream (12) from the gas turbine (10), the at least a portion of the oxidant stream (21) from the forced draft fan (20), and the draft air stream (27) from the valve assembly (25) to the reformer furnace (30);
   a sensor (24) responsive to a pressure in the conduit (16); and
   a controller (100) operatively connected to at least one of the valve assembly (25) for providing the draft air stream (27) and the valve assembly (15) for controlling the exhaust stream (12), the controller (100) operatively connected to the sensor (24) and responsive to signals from the sensor (24).

Aspect 17. The apparatus of any one of aspects 2 to 16 further comprising:
   a second conduit (56) operatively disposed to transport the second portion (59) of the exhaust stream (12) from the gas turbine (10), the at least a portion of the second oxidant stream (61) from the second forced draft fan (60), and the second draft air stream (67) from the second valve assembly (65) to the second reformer furnace (70);
   a second sensor (64) responsive to a pressure in the second conduit (56); and
   a/the controller (100) operatively connected to at least one of the second valve assembly (65) for providing the second draft air stream (67) and the valve assembly (15) for controlling the exhaust stream (12), the controller (100) operatively connected to the second sensor (64) and responsive to signals from the second sensor (64).

Aspect 18. The apparatus of any one of aspects 1 to 17 further comprising:
   a processing unit (40) operatively disposed to receive a/the reformate stream (36) and a/the combustion product gas stream (38), the processing unit comprising at least one of a shift reactor, a steam generation system, a deaerator, a pressure swing adsorption unit, a $CO_2$ removal unit, a cryogenic separator, and a knock-out drum.

Aspect 19. The apparatus of aspect 18 wherein the processing unit (40) comprises a pressure swing adsorption unit.

Aspect 20. The apparatus of any one of aspects 2 to 19 further comprising:
   a second processing unit (80) operatively disposed to receive a/the second reformate stream (76) and a/the second combustion product gas stream (78), the second processing unit (80) comprising at least one of a shift reactor, a steam generation system, a deaerator, a pressure swing adsorption unit, a $CO_2$ removal unit, a cryogenic separator, and a knock-out drum.

Aspect 21. The apparatus of aspect 20 wherein the second processing unit (80) comprises a pressure swing adsorption unit separate from the pressure swing adsorption unit of the first processing unit (40).

Aspect 22. The apparatus according to aspect 16 further comprising:
a sensor (35) that is responsive to pressure in the combustion space of the reformer furnace (30), wherein the controller (100) is operatively connected to receive signals from the sensor (35);
wherein a/the induced draft fan (50) is operatively disposed to receive a/the combustion product gas stream (38) from the reformer furnace (30), wherein the induced draft fan (50) is operatively connected to receive signals from the controller (100) responsive to the signals from the sensor (35) that is responsive to pressure in the reformer furnace (30). The controller may be configured to change the speed of the induced draft fan.

Aspect 23. The apparatus according to aspect 22 further comprising:
a sensor (52) that is responsive to oxygen concentration in the combustion product gas stream (38) from the reformer furnace (30), wherein the controller (100) is operatively connected to receive signals from the sensor (52) that is responsive to oxygen concentration in the combustion product gas stream (38);
wherein the induced draft fan is operatively connected to receive signals from the controller (100) responsive to the signals from the sensor (52) that is responsive to oxygen concentration in the combustion product gas stream (38).

Aspect 24. The apparatus according to aspect 16 further comprising:
a sensor (75) that is responsive to pressure in the second reformer furnace (70), wherein the controller (100) is operatively connected to receive signals from the sensor (75);
wherein a/the second induced draft fan (90) is operatively disposed to receive a/the second combustion product gas stream (78) from the second reformer furnace (70), wherein the second induced draft fan (90) is operatively connected to receive signals from the controller (100) responsive to the signals from the sensor (75) that is responsive to pressure in the second reformer furnace (70).

Aspect 25. The apparatus according to aspect 24 further comprising:
a sensor (92) that is responsive to oxygen concentration in the second combustion product gas stream (78) from the second reformer furnace (70), wherein the controller (100) is operatively connected to receive signals from the sensor (92) that is responsive to oxygen concentration in the second combustion product gas stream (78);
wherein the second induced draft fan (90) is operatively connected to receive signals from the controller (100) responsive to the signals from the sensor (92) that is responsive to oxygen concentration in the second combustion product gas stream (78).

Aspect 26. The apparatus of aspect 1 further comprising:
a second forced draft fan (160) having an outlet for discharging a second oxidant stream (161);
a second valve assembly (165) for providing a second draft air stream (167); and
a heat recovery steam generator (170) operatively connected to the gas turbine (10), the second forced draft fan (160), and the second valve assembly (165), and operatively disposed to receive a second portion (159) of the exhaust stream (12) from the gas turbine (10), at least a portion of the second oxidant stream (161) from the second forced draft fan (160), and the second draft air stream (167) from the second valve assembly (165).

Aspect 27. The apparatus of aspect 26 further comprising:
a second heat exchanger (162) operatively disposed between the second forced draft fan (160) and the heat recovery steam generator (170), wherein the second heat exchanger (162) is operatively disposed to receive the at least a portion of the second oxidant stream (161) from the second forced draft fan (160), and the heat recovery steam generator (170) is operatively disposed to receive the at least a portion of the second oxidant stream (161) from the second heat exchanger (162).

Aspect 28. The apparatus of aspect 27 wherein the second heat exchanger (162) is operatively disposed to provide indirect heat transfer between the at least a portion of the second oxidant stream (161) and at least one of a portion or all of a/the combustion product gas stream from the reformer furnace (30) and a portion or all of a/the reformate stream from the plurality of catalyst-containing reformer tubes of the reformer furnace (30).

Aspect 29. The apparatus of any one of aspects 26 to 28 further comprising:
a second induced draft fan (190) operatively disposed to receive an exhaust gas stream (178) from the heat recovery steam generator (170).

Aspect 30. The apparatus of any one of aspects 26 to 29 further comprising: a second conduit operatively disposed to transport the second portion (159) of the exhaust stream (12) from the gas turbine (10), the at least a portion of the second oxidant stream (161) from the second forced draft fan (160), and the second draft air stream (167) from the second valve assembly (165) to the heat recovery steam generator (170);
a second sensor (164) responsive to a pressure in the second conduit; and
a controller (100) operatively connected to at least one of the second valve assembly (165) for providing the second draft air stream (167) and the valve assembly (15) for controlling the exhaust stream (12), the controller (100) operatively connected to the second sensor (164) and responsive to signals from the second sensor (164).

Aspect 31. The apparatus according to aspect 30 further comprising:
a sensor (175) that is responsive to pressure in the heat recovery steam generator (170), wherein the controller (100) is operatively connected to receive signals from the sensor (175);
wherein a/the second induced draft fan (190) is operatively disposed to receive a/the exhaust stream (178) from the heat recovery steam generator (170), wherein the second induced draft fan (90) is operatively connected to receive signals from the controller (100) responsive to the signals from the sensor (75) that is responsive to pressure in the heat recovery steam generator (170).

Aspect 32. The apparatus according to aspect 31 further comprising:
a sensor (192) that is responsive to oxygen concentration in the exhaust stream (178) from the heat recovery steam generator (170), wherein the controller (100) is operatively connected to receive signals from the sensor (192) that is responsive to oxygen concentration in the exhaust stream (178);
wherein the second induced draft fan (190) is operatively connected to receive signals from the controller (100)

responsive to the signals from the sensor (192) that is responsive to oxygen concentration in the exhaust stream (178).

Aspect 33. A hydrogen production process comprising:
a primary operating mode, the primary operating mode comprising:
blending a first quantity of an oxidant stream (21) from a forced draft fan (20) with a first quantity of at least a portion (19) of an exhaust stream (12) from a gas turbine (10) to form a first quantity of a blended oxidant stream (26) comprising gas turbine exhaust;
introducing a first quantity of a reformer feed gas stream (34) into a plurality of catalyst-containing reformer tubes in a reformer furnace (30), reacting the first quantity of the reformer feed gas stream (34) in a reforming reaction under reaction conditions effective to form a first quantity of a reformate stream (36) comprising $H_2$, CO, $CH_4$, and $H_2O$, and withdrawing the first quantity of the reformate stream (36) from the plurality of catalyst-containing reformer tubes of the reformer furnace (30); and
combusting a first quantity of a fuel stream (32) with at least a portion of the first quantity of the blended oxidant stream (26) comprising gas turbine exhaust in the reformer furnace (30) external to the plurality of catalyst-containing reformer tubes under conditions effective to combust the first quantity of the fuel stream (32) to form a first quantity of a combustion product gas stream (38) and generate heat to supply energy for reacting the first quantity of the reformer feed gas stream (34) inside the plurality of catalyst-containing reformer tubes, and withdrawing the first quantity of the combustion product gas stream (38) from the reformer furnace (30);
a secondary operating mode, the secondary operating mode commencing when the exhaust stream (12) from the gas turbine (10) becomes interrupted or becomes otherwise unavailable, the secondary operating mode comprising:
opening a valve assembly (25) and blending a first quantity of a draft air stream (27) with a second quantity of the oxidant stream (21) to form a first quantity of a blended oxidant stream (29) comprising draft air;
introducing a second quantity of the reformer feed gas stream (34) into the plurality of catalyst-containing reformer tubes in the reformer furnace (30), reacting the second quantity of the reformer feed gas stream (34) in the reforming reaction under reaction conditions effective to form a second quantity of the reformate stream (36) comprising $H_2$, CO, $CH_4$, and $H_2O$, and withdrawing the second quantity of the reformate stream (36) from the plurality of catalyst-containing reformer tubes of the reformer furnace (30); and
combusting a second quantity of the fuel stream (32) with at least a portion of the first quantity of the blended oxidant stream comprising draft air (29) in the reformer furnace (30) external to the plurality of catalyst-containing reformer tubes under conditions effective to combust the second quantity of the fuel stream (32) to form a second quantity of the combustion product gas stream (38) and generate heat to supply energy for reacting the second quantity of the reformer feed gas stream (34) inside the plurality of catalyst-containing reformer tubes, and withdrawing the second quantity of the combustion product gas stream (38) from first reformer furnace (30).

Aspect 34. The process of aspect 33 wherein at the start of the secondary operating mode, the valve assembly (25) is opened to a predetermined position, the predetermined position depending upon an operating rate of the gas turbine prior to the start of the secondary operating mode.

Aspect 35. The process of aspects 33 or aspect 34, further comprising:
passing the first quantity of the oxidant stream (21) from the forced draft fan (20) to a heat exchanger (22) prior to blending the first quantity of the oxidant stream (21) from the forced draft fan (20) with the first quantity of the at least a portion (19) of the exhaust stream (12) thereby heating the first quantity of the oxidant stream (21) from the forced draft fan (20); and
passing the second quantity of the oxidant stream (21) from the forced draft fan (20) to the heat exchanger (22) prior to blending the first quantity of the draft air stream (27) with the second quantity of the oxidant stream (21) thereby heating the second quantity of the oxidant stream (21) from the forced draft fan (20).

Aspect 36. The process of aspect 35 wherein the oxidant stream (21) is heated in the heat exchanger (22) by indirect heat transfer with at least one of a portion or all of the combustion product gas stream (38) from the reformer furnace (30) and a portion or all of the reformate stream (36) from the plurality of catalyst-containing reformer tubes of the reformer furnace (30).

Aspect 37. The process of any one of aspects 33 to 36
wherein the reformer furnace (30) has a pressure external to the plurality of catalyst-containing reformer tubes;
wherein the primary operating mode further comprises passing the first quantity of the combustion product gas stream (38) from the reformer furnace (30) to an induced draft fan 50, where the induced draft fan (50) is operated so that the pressure external to the plurality of catalyst-containing reformer tubes in the reformer furnace (30) ranges from −2.5 kPag (−10 inches $H_2O$) to +0.25 kPag (+1 inch of water), or ranges from −1.5 kPag (−6 inches $H_2O$) to −0.5 kPag (−2 inches $H_2O$), or ranges from −1 kPag (−4 inches $H_2O$) to −0.75 kPag (−3 inches $H_2O$); and
wherein the secondary operating mode further comprises passing the second quantity of the combustion product gas stream (38) from the reformer furnace (30) to the induced draft fan (50), where the induced draft fan (50) is operated so that the pressure external to the plurality of catalyst-containing reformer tubes in the reformer furnace (30) ranges from −2.5 kPag (−10 inches $H_2O$) to +0.25 kPag (+1 inch of water), or ranges from −1.5 kPag (−6 inches $H_2O$) to −0.5 kPag (−2 inches $H_2O$), or ranges from −1 kPag (−4 inches $H_2O$) to −0.75 kPag (−3 inches $H_2O$).

Aspect 38. The process of any one aspects 33 to 37 further comprising:
a tertiary operating mode, the tertiary operating mode commencing subsequent to the secondary operating mode, the tertiary operating mode performed when the exhaust stream from the gas turbine is unavailable, the tertiary operating mode comprising:
partially closing the valve assembly (25) and blending a second quantity of the draft air stream (27) with a third quantity of the oxidant stream (21) to form a second quantity of the blended oxidant stream comprising draft air (29);

introducing a third quantity of the reformer feed gas stream (34) into the plurality of catalyst-containing reformer tubes in the reformer furnace (30), reacting the third quantity of the reformer feed gas stream (34) under reaction conditions effective to form a third quantity of the reformate stream (36) comprising $H_2$, CO, $CH_4$, and $H_2O$, and withdrawing the third quantity of the reformate stream (36) from the plurality of catalyst-containing reformer tubes of the reformer furnace (30); and combusting a third quantity of the fuel stream (32) with at least a portion of the second quantity of the blended oxidant stream comprising draft air (29) in the reformer furnace (30) external to the plurality of catalyst-containing reformer tubes under conditions effective to combust the third quantity of the fuel stream (32) to form a third quantity of the combustion product gas stream (38) and generate heat to supply energy for reacting the third quantity of the reformer feed gas stream (34) inside the plurality of catalyst-containing reformer tubes, and withdrawing the third quantity of the combustion product gas stream (38) from the reformer furnace (30);

wherein the first quantity of the oxidant stream (21) has a time-averaged mass flow rate, $F_1$;

wherein the second quantity of the oxidant stream (21) has a time-averaged mass flow rate, $F_2$;

wherein the third quantity of the oxidant stream (21) has a time-averaged mass flow rate, $F_3$;

wherein the first quantity of the draft air stream (27) has a time-averaged mass flow rate, $G_1$;

wherein the second quantity of the draft air stream (27) has a time-averaged mass flow rate $G_2$; and wherein $F_3 > F_1$, $F_3 > F_2$, and $G_1 > G_2$.

Aspect 39. The process of aspect 38 further comprising passing the third quantity of the oxidant stream (21) from the forced draft fan (20) to the heat exchanger (22) prior to blending the second quantity of the draft air stream (27) with the third quantity of the oxidant stream (21) thereby heating the third quantity of the oxidant stream (21) from the forced draft fan (20).

Aspect 40. The process of aspect 38 or aspect 39 wherein the reformer furnace (30) has a pressure external to the plurality of catalyst-containing reformer tubes;

wherein the primary operating mode further comprises passing the first quantity of the combustion product gas stream (38) from the reformer furnace (30) to an induced draft fan (50), where the induced draft fan (50) is operated (i.e. motor speed for the blower) so that the pressure external to the plurality of catalyst-containing reformer tubes in the reformer furnace (30) ranges from −2.5 kPag (−10 inches $H_2O$) to +0.25 kPag (+1 inch of water) or ranges from −1.5 kPag (−6 inches $H_2O$) to −0.5 kPag (−2 inches $H_2O$) or ranges from −1 kPag (−4 inches $H_2O$) to −0.75 kPag (−3 inches $H_2O$);

wherein the secondary operating mode further comprises passing the second quantity of the combustion product gas stream (38) from the reformer furnace (30) to the induced draft fan (50), where the induced draft fan (50) is operated so that the pressure external to the plurality of catalyst-containing reformer tubes in the reformer furnace (30) ranges from −2.5 kPag (−10 inches $H_2O$) to +0.25 kPag (+1 inch of water) or ranges from −1.5 kPag (−6 inches $H_2O$) to −0.5 kPag (−2 inches $H_2O$) or ranges from −1 kPag (−4 inches $H_2O$) to −0.75 kPag (−3 inches $H_2O$); and wherein the tertiary operating mode further comprises passing the third quantity of the combustion product gas stream (38) from the reformer furnace (30) to the induced draft fan (50), where the induced draft fan (50) is operated so that the pressure external to the plurality of catalyst-containing reformer tubes in the reformer furnace (30) ranges from −2.5 kPag (−10 inches $H_2O$) to +0.25 kPag (+1 inch of water) or ranges from −1.5 kPag (−6 inches $H_2O$) to −0.5 kPag (−2 inches $H_2O$) or ranges from −1 kPag (−4 inches $H_2O$) to −0.75 kPag (−3 inches $H_2O$).

Aspect 41. The process of any one of aspects 38 to 40 further comprising a vent mode, the vent mode comprising:

blending a fourth quantity of the oxidant stream from the forced draft fan (20) with a second quantity of the at least a portion (19) of the exhaust stream (12) from the gas turbine (10) to form a second quantity of the blended oxidant stream comprising gas turbine exhaust (26);

opening the valve assembly (25) and discharging a first portion of the second quantity of the blended oxidant stream (26) through a vent (18) (as vent stream (28));

introducing a fourth quantity of the reformer feed gas stream (34) into the plurality of catalyst-containing reformer tubes in the reformer furnace (30), reacting the fourth quantity of the reformer feed gas stream (34) under reaction conditions effective to form a fourth quantity of the reformate stream (36) comprising $H_2$, CO, $CH_4$, and $H_2O$, and withdrawing the fourth quantity of the reformate stream (36) from the plurality of catalyst-containing reformer tubes of the reformer furnace (30); and combusting a fourth quantity of the fuel stream (32) with a second portion of the second quantity of the blended oxidant stream (26) in the reformer furnace (30) external to the plurality of catalyst-containing reformer tubes under conditions effective to combust the fourth quantity of the fuel stream (32) to form a fourth quantity of the combustion product gas stream (38) and generate heat to supply energy for reacting the fourth quantity of the reformer feed gas stream (34) inside the plurality of catalyst-containing reformer tubes of the reformer, and withdrawing the fourth quantity of the combustion product gas stream (38) from the reformer furnace (30).

Aspect 42. The process of aspect 41 further comprising passing the fourth quantity of the oxidant stream (21) from the forced draft fan (20) to the heat exchanger (22) prior to blending the fourth quantity of the oxidant stream with the second quantity of the at least a portion of the exhaust stream from the gas turbine thereby heating the fourth quantity of the oxidant stream from the forced draft fan (20).

Aspect 43. The process of any one of aspects 33 to 42 further comprising a gas turbine start-up mode, the gas turbine start-up mode comprising:

passing a start-up quantity of the exhaust stream (12) from the gas turbine (10) to a valve assembly (15) for controlling the exhaust stream (12) from the gas turbine (10), wherein the valve assembly (15) for controlling the exhaust stream (12) discharges the start-up quantity of the exhaust stream through a gas turbine exhaust vent (17) such that no portion of the start-up quantity of the exhaust stream (12) discharged through the gas turbine exhaust vent (17) is used as an oxidant for combustion in the first reformer furnace (30) or other reformer furnace.

Aspect 44. The process of any one of aspects 33 to 43 wherein the primary operating mode further comprises:

blending a first quantity of a second oxidant stream (61) from a second forced draft fan (60) with a first quantity of a second portion (59) of the exhaust stream (12) from the gas turbine (10) to form a first quantity of a second blended oxidant stream comprising gas turbine exhaust (66);

introducing a first quantity of a second reformer feed gas stream (74) into a plurality of catalyst-containing reformer tubes in a second reformer furnace (70), reacting the first quantity of the second reformer feed gas stream (74) in a reforming reaction under reaction conditions effective to form a first quantity of a second reformate stream (76) comprising $H_2$, CO, $CH_4$, and $H_2O$, and withdrawing the first quantity of the second reformate stream (76) from the plurality of catalyst-containing reformer tubes of the second reformer furnace (70); and combusting a first quantity of a second fuel stream (72) with at least a portion of the first quantity of the second blended oxidant stream comprising gas turbine exhaust (66) in the second reformer furnace (70) external to the plurality of catalyst-containing reformer tubes of the second reformer furnace under conditions effective to combust the first quantity of the second fuel stream (72) to form a first quantity of a second combustion product gas stream (78) and generate heat to supply energy for reacting the first quantity of the second reformer feed gas stream (74) inside the plurality of catalyst-containing reformer tubes of the second reformer, and withdrawing the first quantity of the second combustion product gas stream (78) from the second reformer furnace (70);

and wherein the secondary operating mode further comprises:

opening a second valve assembly (65) and blending a first quantity of a second draft air stream (67) with a second quantity of the second oxidant stream (61) to form a first quantity of a second blended oxidant stream comprising draft air (69);

introducing a second quantity of the second reformer feed gas stream (74) into the plurality of catalyst-containing reformer tubes in the second reformer furnace (70), reacting the second quantity of the second reformer feed gas stream (74) under reaction conditions effective to form a second quantity of the second reformate stream (76) comprising $H_2$, CO, $CH_4$, and $H_2O$, and withdrawing the second quantity of the second reformate stream (76) from the plurality of catalyst-containing reformer tubes of the second reformer furnace (70); and combusting a second quantity of the second fuel stream (72) with at least a portion of the first quantity of the second blended oxidant stream comprising draft air (69) in the second reformer furnace (70) external to the plurality of catalyst-containing reformer tubes of the second reformer under conditions effective to combust the second quantity of the second fuel stream (72) to form a second quantity of the second combustion product gas stream (78) and generate heat to supply energy for reacting the second quantity of the second reformer feed gas stream (74) inside the plurality of catalyst-containing reformer tubes of the second reformer, and withdrawing the second quantity of the second combustion product gas stream (78) from the second reformer furnace (70).

Aspect 45. The process of aspect 44 wherein at the start of the secondary operating mode, the second valve assembly (65) is opened to a predetermined position for the second valve assembly, the predetermined position for the second valve assembly depending upon an operating rate of the gas turbine prior to the start of the secondary operating mode.

Aspect 46. The process of aspect 44 or aspect 45 further comprising:

passing the first quantity of a second oxidant stream (61) from the second forced draft fan (60) to a second heat exchanger (62) prior to blending the first quantity of the second oxidant stream (61) from the second forced draft fan (60) with the first quantity of the second portion of the exhaust stream thereby heating the first quantity of the second oxidant stream (61) from the second forced draft fan (60);

passing the second quantity of the second oxidant stream (61) from the second forced draft fan (60) to a second heat exchanger (62) prior to blending the first quantity of the second draft air stream (67) with the second quantity of the second oxidant stream thereby heating the second quantity of the second oxidant stream from the second forced draft fan (60).

Aspect 47. The process of any one of aspects 44 to 46 wherein the second reformer furnace (70) has a pressure external to the plurality of catalyst-containing reformer tubes;

wherein the primary operating mode further comprises passing the first quantity of the second combustion product gas stream (78) from the second reformer furnace (70) to an second induced draft fan (90), where the second induced draft fan (90) is operated so that the pressure external to the plurality of catalyst-containing reformer tubes in the second reformer furnace (70) ranges from −2.5 kPag (−10 inches $H_2O$) to +0.25 kPag (+1 inch of water) or ranges from −1.5 kPag (−6 inches $H_2O$) to −0.5 kPag (−2 inches $H_2O$) or ranges from −1 kPag (−4 inches $H_2O$) to −0.75 kPag (−3 inches $H_2O$); and wherein the secondary operating mode further comprises passing the second quantity of the second combustion product gas stream (78) from the second reformer furnace (70) to the second induced draft fan (90), where the second induced draft fan (90) is operated so that the pressure external to the plurality of catalyst-containing reformer tubes in the second reformer furnace (70) ranges from −2.5 kPag (−10 inches $H_2O$) to +0.25 kPag (+1 inch of water) or ranges from −1.5 kPag (−6 inches $H_2O$) to −0.5 kPag (−2 inches $H_2O$) or ranges from −1 kPag (−4 inches $H_2O$) to −0.75 kPag (−3 inches $H_2O$).

Aspect 48. The process of any one of aspects 38 to 47 wherein the tertiary operating mode further comprises:

partially closing the second valve assembly (65) and blending a second quantity of the second draft air stream (67) with a third quantity of the second oxidant stream to form a second quantity of the second blended oxidant stream comprising draft air (69);

introducing a third quantity of the second reformer feed gas stream (74) into the plurality of catalyst-containing reformer tubes in the second reformer furnace (70), reacting the third quantity of the second reformer feed gas stream (74) under reaction conditions effective to form a third quantity of the second reformate stream (76) comprising $H_2$, CO, $CH_4$, and $H_2O$, and withdrawing the third quantity of the second reformate stream (76) from the plurality of catalyst-containing reformer tubes of the second reformer furnace (70); and combusting a third quantity of the second fuel stream (72) with at least a portion of the second quantity of the second blended oxidant stream comprising draft air (69) in the second reformer furnace (70) external to the plurality of catalyst-containing reformer tubes under conditions effective to combust the third quantity of the second fuel stream (72) to form a third quantity of the second combustion product gas stream (78) and generate heat to supply energy for reacting the third quantity of the second reformer feed gas stream (74) inside the plurality of catalyst-containing reformer tubes, and withdrawing the third quantity of the second combustion product gas stream (78) from the second reformer furnace (70);

wherein the first quantity of the second oxidant stream (61) has a time-averaged mass flow rate, $F_4$;

wherein the second quantity of the second oxidant stream (61) has a time-averaged mass flow rate, $F_5$;

wherein the third quantity of the second oxidant stream (61) has a time-averaged mass flow rate, $F_6$;

wherein the first quantity of the second draft air stream (67) has a time-averaged mass flow rate, $G_3$;

wherein the second quantity of the second draft air stream (67) has a time-averaged mass flow rate $G_4$; and wherein $F_6 > F_4$, $F_6 > F_5$, and $G_3 > G_4$.

Aspect 49. The process of aspect 48 further comprising passing the third quantity of the second oxidant stream (61) from the second forced draft fan (60) to the second heat exchanger (62) prior to blending the second quantity of the second draft air stream (67) with the third quantity of the second oxidant stream (61) thereby heating the third quantity of the second oxidant stream (61) from the second forced draft fan (60).

Aspect 50. The process of aspect 49 wherein the second oxidant stream (61) is heated in the second heat exchanger (62) by indirect heat transfer with at least one of the second combustion product gas stream (78) from the second reformer furnace (70) and the second reformate stream (76) from the plurality of catalyst-containing reformer tubes of the second reformer furnace (80).

Aspect 51. The process of any one of aspects 48 to 50 wherein the second reformer furnace (70) has a pressure external to the plurality of catalyst-containing reformer tubes;

wherein the primary operating mode further comprises passing the first quantity of the second combustion product gas stream (78) from the second reformer furnace (70) to a second induced draft fan (90), where the second induced draft fan (90) is operated so that the pressure external to the plurality of catalyst-containing reformer tubes in the second reformer furnace (70) ranges from −2.5 kPag (−10 inches $H_2O$) to +0.25 kPag (+1 inch of water) or ranges from −1.5 kPag (−6 inches $H_2O$) to −0.5 kPag (−2 inches $H_2O$) or ranges from −1 kPag (−4 inches $H_2O$) to −0.75 kPag (−3 inches $H_2O$);

wherein the secondary operating mode further comprises passing the second quantity of the second combustion product gas stream (78) from the second reformer furnace (70) to the second induced draft fan (90), where the second induced draft fan (90) is operated so that the pressure external to the plurality of catalyst-containing reformer tubes in the second reformer furnace (70) ranges from −2.5 kPag (−10 inches $H_2O$) to +0.25 kPag (+1 inch of water) or ranges from −1.5 kPag (−6 inches $H_2O$) to −0.5 kPag (−2 inches $H_2O$) or ranges from −1 kPag (−4 inches $H_2O$) to −0.75 kPag (−3 inches $H_2O$); and wherein the tertiary operating mode further comprises passing the third quantity of the second combustion product gas stream (78) from the second reformer furnace (70) to the second induced draft fan (90), where the second induced draft fan (90) is operated so that the pressure external to the plurality of catalyst-containing reformer tubes in the second reformer furnace (70) ranges from −2.5 kPag (−10 inches $H_2O$) to +0.25 kPag (+1 inch of water) or ranges from −1.5 kPag (−6 inches $H_2O$) to −0.5 kPag (−2 inches $H_2O$) or ranges from −1 kPag (−4 inches $H_2O$) to −0.75 kPag (−3 inches $H_2O$).

Aspect 52. The process of any one of aspects 48 to 51 further comprising a second vent mode, the second vent mode comprising:

blending a fourth quantity of the second oxidant stream with a second quantity of the second portion (59) of the exhaust stream (12) from the gas turbine (10) to form a second quantity of the second blended oxidant stream comprising gas turbine exhaust (66);

opening the second valve assembly (65) and discharging a first portion of the second quantity of the second blended oxidant stream (66) through a second vent (58);

introducing a fourth quantity of the second reformer feed gas stream (74) into the plurality of catalyst-containing reformer tubes in the second reformer furnace (70), reacting the fourth quantity of the second reformer feed gas stream (74) under reaction conditions effective to form a fourth quantity of the second reformate stream (76) comprising $H_2$, CO, $CH_4$, and $H_2O$, and withdrawing the fourth quantity of the second reformate stream (76) from the plurality of catalyst-containing reformer tubes of the second reformer furnace (70); and combusting a fourth quantity of the second fuel stream (72) with a second portion of the second quantity of the second blended oxidant stream (66) in the second reformer furnace (70) external to the plurality of catalyst-containing reformer tubes under conditions effective to combust the fourth quantity of the second fuel stream (72) to form a fourth quantity of the second combustion product gas stream (78) and generate heat to supply energy for reacting the fourth quantity of the second reformer feed gas stream (74) inside the plurality of catalyst-containing reformer tubes of the second reformer, and withdrawing the fourth quantity of the second combustion product gas stream (78) from the second reformer furnace (70).

Aspect 53. The process of aspect 52 further comprising passing the fourth quantity of the second oxidant stream (61) from the second forced draft fan (60) to the second heat exchanger (62) prior to blending the fourth quantity of the second oxidant stream with the second quantity of the second portion (59) of the exhaust stream (12) from the gas turbine (10) thereby heating the fourth quantity of the second oxidant stream from the forced draft fan (60).

Aspect 54. The process of any one of aspects 33 to 53 wherein at least one of the first quantity of the reformate stream (36), the second quantity of the reformate stream (36), and the third quantity of the reformate stream (36) from the plurality of catalyst-containing reformer tubes of the reformer furnace (30) is separated by pressure swing adsorption in a pressure swing adsorber (40) to produce a $H_2$-containing product (45) and a by-product gas (33), and wherein the first fuel stream (32) comprises at least a portion of the by-product gas (33).

Aspect 55. The process of any one of aspects 34 to 54 wherein at least one of the first quantity of the reformate stream (76), the second quantity of the reformate stream (76), and the third quantity of the reformate stream (76) from the plurality of catalyst-containing reformer tubes of the second reformer furnace (70) is separated by pressure swing adsorption in a pressure swing adsorber (80) to produce a $H_2$-containing product (85) and a by-product gas (73), and wherein the second fuel stream (72) comprises at least a portion of the by-product gas (73).

Aspect 56. The process of any one of aspects 33 to 55 further comprising:
  acquiring first pressure data of the blended oxidant stream comprising gas turbine exhaust during the primary operating mode;
  acquiring second pressure data responsive to pressure in the reformer furnace external to the plurality of catalyst-containing reformer tubes during the primary operating mode;
  acquiring oxygen concentration data for the combustion product gas stream (38) during the primary operating mode;
  opening and closing the valve assembly (25) responsive to the first pressure data acquired during the primary operating mode, the second pressure data acquired during the primary operating mode, and the oxygen concentration data acquired during the primary operating mode;
  adjusting the speed of the forced draft fan (20) responsive to the first pressure data acquired during the primary operating mode, the second pressure data acquired during the primary operating mode, and the and the oxygen concentration data acquired during the primary operating mode; and
  adjusting the speed of the induced draft fan (50) responsive to the first pressure data acquired during the primary operating mode, the second pressure data acquired during the primary operating mode, and the and the oxygen concentration data acquired during the primary operating mode.

Aspect 57. The process of any one of aspects 33 to 56 further comprising:
  acquiring first pressure data of the blended oxidant stream comprising draft air during the secondary operating mode;
  acquiring second pressure data responsive to pressure in the reformer furnace external to the plurality of catalyst-containing reformer tubes during the secondary operating mode;
  acquiring oxygen concentration data for the combustion product gas stream (38) during the secondary operating mode;
  opening and closing the valve assembly (25) responsive to the first pressure data acquired during the secondary operating mode, the second pressure data acquired during the secondary operating mode, and the oxygen concentration data acquired during the secondary operating mode; and
  adjusting the speed of the forced draft fan (20) responsive to the first pressure data acquired during the secondary operating mode, the second pressure data acquired during the secondary operating mode, and the and the oxygen concentration data acquired during the secondary operating mode; and
  adjusting the speed of the induced draft fan (50) responsive to the first pressure data acquired during the secondary operating mode, the second pressure data acquired during the secondary operating mode, and the and the oxygen concentration data acquired during the secondary operating mode.

Aspect 58. The process of any one of aspects 38 to 57 further comprising:
  acquiring first pressure data of the blended oxidant stream comprising draft air during the tertiary operating mode;
  acquiring second pressure data responsive to pressure in the reformer furnace external to the plurality of catalyst-containing reformer tubes during the tertiary operating mode;
  acquiring oxygen concentration data for the combustion product gas stream (38) during the tertiary operating mode;
  opening and closing the valve assembly (25) responsive to the first pressure data acquired during the tertiary operating mode, the second pressure data acquired during the tertiary operating mode, and the oxygen concentration data acquired during the tertiary operating mode;
  adjusting the speed of the forced draft fan (20) responsive to the first pressure data acquired during the tertiary operating mode, the second pressure data acquired during the tertiary operating mode, and the and the oxygen concentration data acquired during the tertiary operating mode; and
  adjusting the speed of the induced draft fan (50) responsive to the first pressure data acquired during the tertiary operating mode, the second pressure data acquired during the tertiary operating mode, and the and the oxygen concentration data acquired during the tertiary operating mode.

Aspect 59. The process of any one of aspects 44 to 58 further comprising:
  acquiring first pressure data of the second blended oxidant stream (66) comprising gas turbine exhaust during the primary operating mode;
  acquiring second pressure data responsive to pressure in the second reformer furnace (70) external to the plurality of catalyst-containing reformer tubes during the primary operating mode;
  acquiring oxygen concentration data for the second combustion product gas stream (78) during the primary operating mode;
  opening and closing the second valve assembly (65) responsive to the first pressure data of the second blended oxidant stream (66) acquired during the primary operating mode, the second pressure data responsive to pressure in the second reformer furnace (70) acquired during the primary operating mode, and the oxygen concentration data for the second combustion product gas stream (78) acquired during the primary operating mode;
  adjusting the speed of the forced draft fan (20) responsive to the first pressure data of the second blended oxidant stream (66) acquired during the primary operating mode, the second pressure data responsive to pressure in the second reformer furnace (70) acquired during the primary operating mode, and the and the oxygen concentration data for the second combustion product gas stream (78) acquired during the primary operating mode; and
  adjusting the speed of the induced draft fan (50) responsive to the first pressure data of the second blended oxidant stream (66) acquired during the primary operating mode, the second pressure data responsive to pressure in the second reformer furnace (70) acquired during the primary operating mode, and the and the oxygen concentration data for the second combustion product gas stream (78) acquired during the primary operating mode.

Aspect 60. The process of any one of aspects 44 to 59 further comprising:

acquiring first pressure data of the second blended oxidant stream (66) comprising draft air during the secondary operating mode;

acquiring second pressure data responsive to pressure in the second reformer furnace (70) external to the plurality of catalyst-containing reformer tubes during the secondary operating mode;

acquiring oxygen concentration data for the second combustion product gas stream (78) during the secondary operating mode;

opening and closing the second valve assembly (65) responsive to the first pressure data of the second blended oxidant stream (66) acquired during the secondary operating mode, the second pressure data responsive to pressure in the second reformer furnace (70) acquired during the secondary operating mode, and the oxygen concentration data for the second combustion product gas stream (78) acquired during the secondary operating mode;

adjusting the speed of the forced draft fan (20) responsive to the first pressure data of the second blended oxidant stream (66) acquired during the secondary operating mode, the second pressure data responsive to pressure in the second reformer furnace (70) acquired during the secondary operating mode, and the and the oxygen concentration data for the second combustion product gas stream (78) acquired during the secondary operating mode; and adjusting the speed of the induced draft fan (50) responsive to the first pressure data of the second blended oxidant stream (66) acquired during the secondary operating mode, the second pressure data responsive to pressure in the second reformer furnace (70) acquired during the secondary operating mode, and the and the oxygen concentration data for the second combustion product gas stream (78) acquired during the secondary operating mode.

Aspect 61. The process of any one of aspects 48 to 60 further comprising:

acquiring first pressure data of the second blended oxidant stream (66) comprising draft air during the tertiary operating mode;

acquiring second pressure data responsive to pressure in the second reformer furnace (70) external to the plurality of catalyst-containing reformer tubes during the tertiary operating mode;

acquiring oxygen concentration data for the second combustion product gas stream (78) during the tertiary operating mode;

opening and closing the second valve assembly (65) responsive to the first pressure data of the second blended oxidant stream (66) acquired during the tertiary operating mode, the second pressure data responsive to pressure in the second reformer furnace (70) acquired during the tertiary operating mode, and the oxygen concentration data for the second combustion product gas stream (78) acquired during the tertiary operating mode;

adjusting the speed of the forced draft fan (20) responsive to the first pressure data of the second blended oxidant stream (66) acquired during the tertiary operating mode, the second pressure data responsive to pressure in the second reformer furnace (70) acquired during the tertiary operating mode, and the and the oxygen concentration data for the second combustion product gas stream (78) acquired during the tertiary operating mode; and adjusting the speed of the induced draft fan (50) responsive to the first pressure data of the second blended oxidant stream (66) acquired during the tertiary operating mode, the second pressure data responsive to pressure in the second reformer furnace (70) acquired during the tertiary operating mode, and the and the oxygen concentration data for the second combustion product gas stream (78) acquired during the tertiary operating mode.

DETAILED DESCRIPTION OF THE PREFERRED EMBODIMENTS

Figure 1:
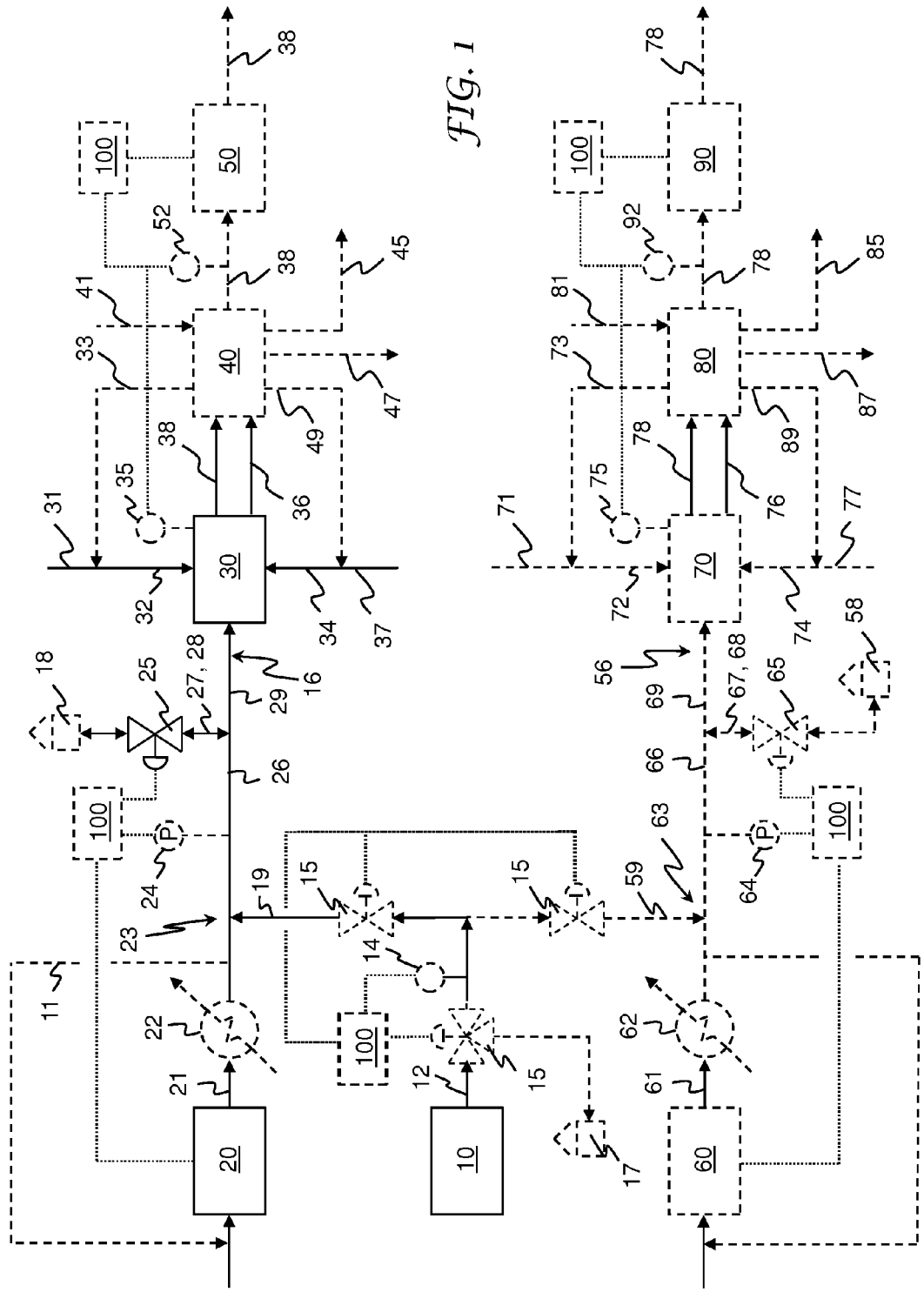
FIG. 1 is a process flow diagram illustrating an embodiment of the present invention with an optional second reformer furnace.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

The term "plurality" means "two or more."

The phrase "at least a portion" means "a portion or all." The at least a portion of a stream may have the same composition with the same concentration of each of the species as the stream from which it is derived. The at least a portion of a stream may have a different composition to that of the stream from which it is derived. The at least a portion of a stream may include specific components of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

As used herein, "first," "second," "third," etc. are used to distinguish from among a plurality of steps and/or features, and is not indicative of the total number, or relative position in time and/or space unless expressly stated as such.

The term "depleted" means having a lesser mole % concentration of the indicated gas than the stream from which it was formed. "Depleted" does not mean that the stream is completely lacking the indicated gas.

The terms "rich" or "enriched" means having a greater mole % concentration of the indicated gas than the stream from which it was formed.

For the purposes of simplicity and clarity, detailed descriptions of well-known devices, circuits, and methods are omitted so as not to obscure the description of the present invention with unnecessary detail.

The present invention relates to an apparatus and process for producing a $H_2$-containing product. The apparatus may be a hydrogen and/or synthesis gas production facility. In a hydrogen production facility, as used herein, a purified hydrogen product may be produced and/or a synthesis gas, which comprises hydrogen, may be produced.

Referring to the drawings, wherein like reference numbers refer to like elements throughout the drawings, FIG. 1 is a process flow diagram showing components of the apparatus for producing a hydrogen-containing product.

The apparatus comprises a gas turbine 10 having an outlet for withdrawing an exhaust stream 12 from the gas turbine 10. Gas turbines are well-known in the art and are available commercially, for example from General Electric Company. A suitable gas turbine may be readily selected by a person skilled in the art. Air and fuel, typically natural gas, are introduced into a gas turbine. A hot exhaust stream 12 and electricity are produced by the gas turbine. The electricity produced by the gas turbine may be used in the hydrogen production facility and/or exported.

The apparatus may comprise a valve assembly 15 for controlling the exhaust stream 12 from the gas turbine 10. The valve assembly 15 includes a movable part that opens, shuts, or partially obstructs one or more ports or passageways in the valve assembly 15. Since the article "a" means "one or more," the valve assembly 15 may comprise more than one valve, as shown. The valve assembly 15 may comprise a three-way valve, and/or a four-way valve. The valve assembly 15 may be operative to control the flow rate of at least a portion 19 of the exhaust stream 12.

The apparatus may comprise a gas turbine exhaust vent 17 (i.e. a local exhaust stack). The gas turbine exhaust vent 17 may be operatively disposed to selectively receive a portion or all of the exhaust stream 12 from the gas turbine 10 via the valve assembly 15 for controlling the exhaust stream 12. Valve assembly 15 may be a diverter damper assembly and may include a diverter damper at the outlet of the gas turbine to direct the exhaust gas either to one or more reformer furnaces or to gas turbine exhaust vent 17.

The apparatus may comprise a controller 100. Controller 100 may be a computer, programmable logic controller (PLC), or the like. Any suitable controller known in the art may be used. Since the article "a" means "one or more," controller 100 may comprise more than one computer and/or PLC. Multiple controller devices may be connected in a master/slave or cascade control relationship.

The apparatus may comprise a sensor 14 operatively connected to the controller 100. The sensor 14 may sense a characteristic of the exhaust stream 12. Sensor 14 may be a pressure sensor. Sensor 14 may be a flow rate sensor.

Controller 100 may be operatively connected to valve assembly 15 to control opening and closing of valve assembly 15 responsive to signals from sensor 14.

Sensor 14 may be a pressure sensor and along with controller 100 may function as an automatic pressure controller that monitors the duct pressure and opens the diverter damper to the turbine exhaust vent 17 if the pressure in the duct exceeds a predetermined maximum pressure.

Sensor 14 may be a flow rate sensor and along with controller 100 may function as an automatic flow rate controller that monitors the flow rate and opens the diverter damper to the turbine exhaust vent 17 if the flow rate in the duct exceeds a predetermined maximum flow rate.

The apparatus comprises a forced draft fan 20 having an outlet for discharging an oxidant stream 21. Forced draft fans are well-known in the art and are available commercially, for example from Robinson Fans or TLT-Babcock. A suitable forced draft fan may be readily selected by a person skilled in the art.

The at least a portion 19 of the exhaust stream 12 and the oxidant stream 21 may be blended at junction 23.

The apparatus comprises a valve assembly 25 for providing a draft air stream 27. The valve assembly 25 may be a so-called damper assembly. The valve assembly 25 includes a movable part that opens, shuts, or partially obstructs one or more ports or passageways in the valve assembly. The valve assembly 25 may be operatively connected to a duct having an opening which can serve as an inlet and an outlet for flow. The opening may have a vent cap to prevent rain and other unwanted matter from passing from the opening back to the valve assembly 25.

The valve assembly 25 may also be suitable for discharging a blended oxidant stream 26 comprising at least a portion of the oxidant stream 21 and at least a portion of the exhaust stream 12 from the gas turbine 10.

Under normal operating conditions valve assembly 25 is closed and combustion oxidant to the reformer furnace 30 is provided by gas turbine exhaust and oxidant stream 21 from the forced draft fan 20 in order to utilize the heat exchanger 22 to heat the oxidant stream 21 for improved energy efficiency. The draft air from valve assembly 25, which is not preheated, is generally intended to supply combustion oxidant during abnormal operating conditions (i.e. when the gas turbine shuts down).

The apparatus comprises a reformer furnace 30. The reformer furnace is operatively connected to the gas turbine 10, the forced draft fan 20, and the valve assembly 25. The reformer furnace 30 is operatively disposed to receive at least a portion 19 of the exhaust stream 12 from the gas turbine 10, at least a portion of the oxidant stream 21 from the forced draft fan 20, and the draft air stream 27 from the valve assembly 25. The portion 19 of the exhaust stream 12 may be a divided portion.

The reformer furnace 30 may be a so-called catalytic steam reformer for producing hydrogen and/or synthesis gas. A catalytic steam reformer, also called a steam methane reformer, is defined herein as any fired furnace used to convert reformer feed containing elemental hydrogen and carbon to synthesis gas by a reaction with steam over a catalyst with heat provided by combustion of a fuel. Feedstock for the reformer feed may be natural gas, methane, naphtha, propane, refinery fuel gas, refinery off-gas, or other suitable reformer feedstock known in the art. Reformer feed may be preformed in a prereformer (not shown). The prereformer may be an adiabatic prereformer. Suitable operating conditions for a catalytic steam reformer and prereformer are known in the art.

Reformer furnaces with a plurality of catalyst-containing reformer tubes, i.e. tubular reformers, are well-known in the art. Suitable materials and methods of construction are known. Catalyst in the catalyst-containing reformer tubes may be any suitable catalyst known in the art, for example, a supported catalyst comprising nickel.

Reformer furnace 30 may comprise a plurality of catalyst-containing reformer tubes wherein the plurality of catalyst-containing reformer tubes are operatively disposed to receive a reformer feed gas stream 34 comprising a hydrocarbon feedstock and steam for reaction thereof over a reforming catalyst to form a reformate stream. As used herein, a reformate stream is any stream comprising hydrogen and carbon monoxide formed from the reforming reaction of a hydrocarbon and steam. The reformer furnace 30 has an outlet for withdrawing a reformate stream 36 formed by reaction of the reformer feed gas stream 34 in the plurality of catalyst-containing reformer tubes. Operating temperatures in the catalyst-containing reformer tubes may range from 350° C. to 650° C. at the inlet and from 750° C. to 950° C. at the outlet. Operating pressures in the catalyst-containing reformer tubes may range from 1 to 50 atm.

Reformer furnace 30 is operatively disposed to receive at least a portion 19 of the exhaust stream 12, at least a portion of the oxidant stream 21, the draft air stream 27, and a fuel stream 32 for combustion thereof in a combustion space external to the plurality of catalyst-containing reformer tubes. At any time during operation, not all of the oxidant steams need to be provided to the reformer furnace at the same time. For example, the fuel can be combusted with the at least a portion of the exhaust gas stream and the at least a portion of the oxidant stream 21 without any draft air. Or the fuel can be combusted with the at least a portion of the oxidant stream 21 and the draft air stream without any exhaust gas. Or the fuel can be combusted with the at least a portion of the exhaust gas stream and the draft air stream without any of the oxidant stream 21.

Reformer furnace 30 has an outlet for withdrawing a combustion product gas stream 38 from the combustion space. The combustion product gas stream 38 is formed by the combustion of the fuel stream 32 with any combination of the various oxidant streams.

Reformate stream 36 and combustion product gas stream 38 may be further processed in processing unit 40. The reformate stream may be further processed to convert more of the reformate stream to $H_2$, to generate an oxo-gas, and/or generate a hydrogen product. An oxo-gas may be further processed to make synthesis gas products. Combustion product gas stream 38 may be further processed to recover waste heat, for example to make steam. Processing unit 40 is operatively disposed to receive reformate stream 36 and combustion product gas stream 38. Processing unit 40 may comprise any known devices for processing reformate and/or combustion product gases in a hydrogen production facility. For example, processing unit 40 may comprise one or more shift reactors, a steam generation system including steam drum, various heat exchangers, a deaerator, a pressure swing adsorption unit, a $CO_2$ removal unit, a cryogenic separator (e.g. an oxo-gas cold box), and a knock-out drum.

The apparatus may further comprise a heat exchanger 22 operatively disposed between the forced draft fan 20 and the reformer furnace 30. The heat exchanger 22 is operatively disposed to receive at least a portion of the oxidant stream 21 from the forced draft fan 20, and the reformer furnace 30 is operatively disposed to receive at least a portion of the oxidant stream 21 from the heat exchanger 22.

The oxidant stream 21 is heated in heat exchanger 22. The oxidant stream may be heated by indirect heat transfer with any suitable hot stream. The oxidant stream 21 may be heated by indirect heat transfer with a portion or all of combustion product gas stream 38 from the reformer furnace 30. Both the oxidant stream 21 and a portion or all of the combustion product gas stream may be passed to heat exchanger 22 for indirect heat transfer between the streams. Alternatively, the oxidant stream 21 may be heated by indirect heat transfer with a portion or all of the combustion product gas stream 38 via a working fluid (i.e. steam). For example, the combustion product gas stream 38 may be used to generate steam and a portion or all of the steam passed to heat exchanger 22 to heat the oxidant stream 21.

The oxidant stream 21 may be heated by indirect heat transfer with a portion or all of reformate stream 36 from the reformer furnace 30. Both the oxidant stream 21 and a portion or all of the reformate stream may be passed to heat exchanger 22 for indirect heat transfer between the streams. Alternatively, the oxidant steam 21 may be heated by indirect heat transfer with a portion or all of the reformate stream via a working fluid (i.e. steam). For example, the reformate stream 36 may be used to generate steam and a portion or all of the steam passed to heat exchanger 22 to heat the oxidant stream 21.

Since the article "a" means "one or more," more than one heat exchanger 22 may be used to heat the oxidant stream 21.

The apparatus may comprise a conduit 16 operatively disposed to transport at least a portion 19 of the exhaust stream 12 from the gas turbine 10, the at least a portion of the oxidant stream 21 from the forced draft fan 20, and the draft air stream 27 from the valve assembly 25 to the reformer furnace 30.

The apparatus may comprise a sensor 24 responsive to pressure in the conduit 16. Controller 100 may be operatively connected to at least one of the valve assembly 25 for providing the draft air stream 27 and valve assembly 15 for controlling the exhaust stream 12. Controller 100 may be operatively connected to sensor 24 and responsive to signals from sensor 24. Sensor 24 may be combined with a controller subunit to form a pressure control unit that receives control instructions from a master controller. The controller may instruct the valve assembly 25 to open when the sensor 24 detects a pressure less than a predetermined lower limit target pressure so as to allow draft air to pass to the reformer furnace 30. The controller may instruct the valve assembly 25 to open when the sensor 24 detects a pressure greater than a predetermined upper limit target pressure so as to allow a vent stream 28 to pass through the valve assembly 25 to vent 18. The controller may instruct the valve assembly 25 to close or remain closed when the sensor 24 detects a pressure within the target range.

The pressure control unit comprising sensor 24 may act as a pressure controller and be operatively connected to vary the fan speed of the forced draft fan 20 in order to maintain the combustion air pressure to the reformer furnace 30 at or slightly below atmospheric pressure. A variable speed viscous coupling may be used to change the speed and flow capacity of the forced draft fan 20. Variable speed viscous couplings have a relatively slow response time to changes in the speed command from the controller and are therefore not able to respond to fast changing conditions during an upset, such as a gas turbine trip.

When the pressure as sensed by sensor 24 decreases below a desired pressure, the pressure control unit may cause the fan speed of the forced draft fan 20 to increase and the valve assembly 25 to open more. If the pressure as sensed by sensor 24 increases too much (i.e. positive pressure), the pressure control unit may also cause the valve assembly 25 to open.

In case of a gas turbine trip, draft air 27 from valve assembly 25 is used to maintain the combustion air supply to the reformer furnace 30. On detection of the turbine trip, the valve assembly 25 may be opened to a predetermined position based on the gas turbine operating rate at the time of the trip. The valve assembly 25/controller 100 may then be placed back into automatic pressure control with a higher pressure set point in the minimum pressure controller (low limiter) in order to restore combustion air flow to the reformer furnace and minimize the pressure upset. The initial target for this set point may be about 0.25 kPa (1 inch $H_2O$) below the forced draft fan's pressure controller set point, as well as being below atmospheric pressure. By setting a higher pressure set point for the forced draft fan, the forced draft fan speed will increase to try to bring the combustion air pressure back up to its normal set point and will decrease the draft air from valve assembly 25. The forced draft fan may increase up to the maximum capacity of the forced draft fan 20.

The valve assembly 25 may respond in a similar manner to supply supplemental combustion oxidant to the reformer furnace 30 in case of oxidant from the forced draft fan 20 being interrupted.

The apparatus may further comprise an induced draft fan 50 operatively disposed to receive combustion product gas stream 38 from reformer furnace 30. Induced draft fans are well-known in the art and are available commercially, for example from Robinson Fans or TLT-Babcock. A suitable induced draft fan may be readily selected by a person skilled in the art.

The apparatus may further comprise a sensor 35 that is responsive to pressure in the combustion space of the reformer furnace 30. Controller 100 may be operatively connected to receive signals from sensor 35. Induced draft fan 50 and/or forced draft fan 20 may be operatively connected to controller 100 to receive signals from the controller 100 responsive to the signals from the sensor 35. Controller 100 may be configured to change the speed of the induced draft fan 50 and/or the speed of forced draft fan 20 responsive to changes in pressure in the combustion space of the reformer furnace 30.

As in a conventional balanced draft reformer furnace, the pressure in the reformer furnace combustion space may be controlled by induced draft fan 50. Induced draft fan 50 may be operated through a variable speed viscous coupling that is manipulated by the combination of sensor 35 and controller 100 to change the fan speed and induced draft fan capacity to maintain the desired pressure in the combustion space of reformer furnace 30. When the pressure in the reformer furnace combustion space increases above a target upper pressure as measured by sensor 35, the controller may cause the fan speed of the induced draft fan 50 to increase. When the pressure in the reformer furnace combustion space decreases below a target lower pressure as measured by sensor 35, the controller may cause the fan speed of the induced draft fan 50 to decrease.

The apparatus may further comprise a sensor 52 that is responsive to oxygen concentration in the combustion product gas stream 38 from the reformer furnace 30. Controller 100 may be operatively connected to receive signals from sensor 52. Induced draft fan 50 and/or forced draft fan 20 may be operatively connected to controller 100 to receive signals from the controller 100 responsive to the signals from the sensor 52. Controller 100 may be configured to change the speed of the induced draft fan 50 and/or the speed of forced draft fan 20 responsive to changes in oxygen concentration of the combustion product gas stream 38 from the reformer furnace 30.

The oxygen concentration in the combustion product gas stream 38 may be controlled to ensure that there is sufficient oxidant supplied to the reformer furnace to support complete combustion of the fuel. Since the forced draft fan maintains a constant combustion oxidant supply pressure upstream of the burners, it is possible to change the flow of the combustion air by manipulating the reformer furnace pressure downstream of the burners. The excess oxygen control is then achieved by manipulating the set point of the reformer furnace pressure control in a cascade control arrangement.

For example, when the oxygen concentration as measured by sensor 52 decreases below a target lower oxygen concentration, the controller reduces the set point for the pressure in the reformer furnace to increase the excess oxygen in the combustion product gas stream. The controller may cause the fan speed of the induced draft fan 50 to increase. This results in a greater pressure differential across the burners, which produces additional combustion oxidant gas flow. This increased combustion oxidant flow causes a reduction in the pressure in the oxidant supply duct upstream of the burners. Sensor 24, sensing the reduced pressure in the ducting upstream of the burners sends signals to the controller 100, which signals to increase the fan speed in forced draft fan 20 thereby increasing the flow of oxidant stream 21.

Correspondingly, when the oxygen concentration as measured by sensor 52 increases above a target upper oxygen concentration, the controller increases the set point for the pressure in the reformer furnace to decrease the excess oxygen in the combustion product gas stream. The controller may cause the fan speed of the induced draft fan 50 to decrease. This results in a lower pressure differential across the burners, which reduces the combustion oxidant gas flow. This decreased combustion oxidant flow causes an increase in the pressure in the oxidant supply duct upstream of the burners. Sensor 24, sensing the increased pressure in the ducting upstream of the burners sends signals to the controller 100, which signals to decrease the fan speed in forced draft fan 20 thereby decreasing the flow of oxidant stream 21.

In order to avoid a high-pressure or low-pressure trip of the reformer furnace 30, upper and lower limits may be applied for the set point pressure for reformer furnace 30 to prevent oxygen control from driving the pressure control into a trip condition via the cascade control action. This may be important, because like the forced draft fan 20, the induced draft fan may utilize a variable speed viscous coupling to change the speed and flow capacity of the induced draft fan 50. As discussed before, variable speed viscous couplings have a relatively slow response time to changes in the speed command from the controller, and the oxygen control has the potential to drive the reformer furnace into a trip condition.

To improve reliability and efficiency, the apparatus may further comprise a second reformer furnace 70 with associated equipment where the second reformer furnace also receives a portion of the exhaust gas stream 12 from the gas turbine 10.

Like the reformer furnace 30, the second reformer furnace 70 may also be a so-called catalytic steam reformer for producing hydrogen and/or synthesis gas.

A second reformer furnace provides redundancy in the system and can therefore improve reliability by at least providing hydrogen product from one of the reformer furnaces in case the other reformer furnace shuts down.

Multiple reformer furnaces can also provide additional flexibility for varied hydrogen production rate requirements. By turning down and/or idling one of the reformer furnaces, turndown of the hydrogen production rate can be more readily facilitated.

But with the added reformer furnace comes some unexpected stability issues. Variations of pressure and flow rate in one reformer furnace may affect operation in the other reformer furnace. The prior art has heretofore not provided suitable flow control methods or apparatus features for dealing with flow stability for multiple reformer furnaces where oxidant for combustion is provided from a common gas turbine.

With the second reformer furnace 70, the apparatus may comprise a second forced draft fan 60 having an outlet for discharging a second oxidant stream 61 and a second valve assembly 65 for providing a second draft air stream 67. The second reformer furnace 70 may be operatively connected to the gas turbine 10, the second forced draft fan 60, and the second valve assembly 65. The second reformer furnace may be operatively disposed to receive a second portion 59 of the exhaust stream 12 from the gas turbine 10, at least a portion of the second oxidant stream 61 from the second forced draft fan 60, and the second draft air stream 67 from the second valve assembly 65. The second portion 59 of the exhaust stream 12 may be a divided portion. At any time during operation of the second reformer furnace 70, the second reformer furnace 70 may receive any combination of one or more of the second portion 59 of the exhaust stream 12 from the gas turbine 10, at least a portion of the second oxidant stream 61 from the second forced draft fan 60, and the draft air stream 67 from the second valve assembly 65.

The second portion 59 of the exhaust stream 12 and the oxidant stream 61 may be blended at junction 63.

In case of multiple reformer furnaces, the gas turbine exhaust ducting and valve assembly 15 may be designed to provide an equal split of the gas turbine exhaust gas flow to each of the reformer furnaces, which is desirable when each of the reformer furnaces is operating at the same production rate. An asymmetrical split of the gas turbine exhaust gas flow may also be achieved when the reformer furnaces are operating at the same or different production rates.

Valve assembly 15 may be operative to control the flow rate of the second portion 59 of the exhaust stream 12.

The second forced draft fan 60 is a separate device from the forced draft fan 20. The second forced draft fan 60 may be the same make and model as the forced draft fan 20 or it may be a different make and/or model.

The second valve assembly 65 may be a so-called damper assembly. The second valve assembly 65 includes a movable part that opens, shuts, or partially obstructs one or more ports or passageways in the second valve assembly 65. The second valve assembly 65 may be operatively connected to a duct having an opening which can serve as an inlet and an outlet for flow. The opening may have a vent cap to prevent rain and other unwanted matter from passing from the opening back to the valve assembly 65.

The second valve assembly 65 may also be suitable for discharging a blended oxidant stream 66 comprising at least a portion of the second oxidant stream 61 and the second portion 59 of the exhaust stream 12 from the gas turbine 10.

Inventors have found that control of flow of the oxidant streams to the multiple reformer furnaces is improved by the valve assembly 25 and the second valve assembly 65.

The discussion above regarding the operation of valve assembly 25 applies similarly to valve assembly 65.

The second reformer furnace 70 may comprise a plurality of catalyst-containing reformer tubes. The plurality of catalyst-containing reformer tubes of the second reformer furnace 70 may be operatively disposed to receive a second reformer feed gas stream 74. The second reformer furnace may be operatively disposed to receive the second portion 59 of the exhaust stream 12, at least a portion of the second oxidant stream 61, the second draft air stream 67, and a second fuel stream 72 for combustion thereof in a combustion space external to the plurality of catalyst-containing reformer tubes of the second reformer furnace 70.

At any time during operation, not all of the oxidant steams need to be provided to the second reformer furnace 70 at the same time. For example, the fuel can be combusted with the second portion of the exhaust gas stream 59 and least a portion of the oxidant stream 61 without any draft air. Or the fuel can be combusted with at least a portion of the oxidant stream 61 and the draft air stream without any exhaust gas. Or the fuel can be combusted with the second portion of the exhaust gas stream and the draft air stream without any of the oxidant stream 61.

The second reformer furnace 70 may have a first outlet for withdrawing a second reformate stream 76 formed from the second reformer feed gas stream 74 in the plurality of catalyst-containing reformer tubes of the second reformer furnace 70. Operating temperatures in the catalyst-containing reformer tubes of the second reformer furnace 70 may range from 350° C. to 650° C. at the inlet and from 750° C. to 950° C. at the outlet. Operating pressures in the catalyst-containing reformer tubes may range from 1 to 50 atm.

The second reformer furnace may have a second outlet for withdrawing a second combustion product gas stream 78 from the combustion space of the second reformer furnace 70 where the second combustion product gas stream is formed by the combustion of the second fuel stream 72. The combustion product gas stream 78 is formed by the combustion of the fuel stream 72 with any combination of the various oxidant streams.

Second reformate stream 76 and second combustion product gas stream 78 may be further processed in second processing unit 80. The second reformate stream may be further processed to convert more of the reformate stream to $H_2$, to generate an oxo-gas, and/or generate a hydrogen product. An oxo-gas may be further processed to make synthesis gas products. Second combustion product gas stream 78 may be further processed to recover waste heat. Second processing unit 80 is operatively disposed to receive the second reformate stream 76 and second combustion product gas stream 78. Second processing unit 80 may comprise any known devices for processing reformate and/or combustion product gases in a hydrogen production facility. For example, second processing unit 80 may comprise one or more shift reactors, a steam generation system including steam drum, various heat exchangers, a deaerator, a pressure swing adsorption unit, a $CO_2$ removal unit, an oxo-gas cold box, and a knock-out drum.

The apparatus may further comprise a second heat exchanger 62 operatively disposed between the second forced draft fan 60 and the second reformer furnace 70. The second heat exchanger 62, if present, is operatively disposed to receive at least a portion of the second oxidant stream 61 from the second forced draft fan 60, and the second reformer furnace 70, if present, is operatively disposed to receive at least a portion of the second oxidant stream 61 from the second heat exchanger 62.

The second oxidant stream 61 may be heated in the second heat exchanger 62. The second oxidant stream may be heated by indirect heat transfer with any suitable hot stream. The second oxidant stream 61 may be heated by indirect heat transfer with a portion or all of the second combustion product gas stream 78 from the second reformer furnace 70. Both the second oxidant stream 61 and a portion or all of the second combustion product gas stream 78 may be passed to the second heat exchanger 62 for indirect heat transfer between the streams. Alternatively, the second oxidant stream 61 may be heated by indirect heat transfer with a portion or all of the second combustion product gas stream 78 via a working fluid (i.e. steam). For example, the second combustion product gas stream 78 may be used to generate steam and a portion or all of the steam passed to the second heat exchanger 62 to heat the second oxidant stream 61.

The second oxidant stream 61 may be heated by indirect heat transfer with a portion or all of second reformate stream 76 from the second reformer furnace 70. Both the second oxidant stream 61 and a portion or all of the reformate stream may be passed to second heat exchanger 62 for indirect heat transfer between the streams. Alternatively, the second oxidant steam 61 may be heated by indirect heat transfer with a portion or all of the second reformate stream via a working fluid (i.e. steam). For example, the second reformate stream 76 may be used to generate steam and a portion or all of the steam passed to the second heat exchanger 62 to heat the second oxidant stream 61.

Since the article "a" means "one or more," more than one heat exchanger may be used to heat the oxidant stream 61.

The apparatus may comprise a second conduit 56 operatively disposed to transport a second portion 59 of the exhaust stream 12 from the gas turbine 10, the at least a portion of the second oxidant stream 61 from the second forced draft fan 60, and the second draft air stream 67 from the second valve assembly 65 to the second reformer furnace 70.

The apparatus may comprise a sensor 64 responsive to pressure in the second conduit 56. Controller 100 may be operatively connected to at least one of the second valve assembly 65 for providing the second draft air stream 67 and valve assembly 15 for controlling the exhaust stream 12. Controller 100 may be operatively connected to sensor 64 and responsive to signals from sensor 64. Sensor 64 may be combined with a controller subunit to form a pressure control unit that receives control instructions from a master controller. The pressure control unit comprising sensor 64 may also be operatively connected to vary the fan speed of the forced draft fan 60. The discussion above regarding the operation of the pressure control unit comprising sensor 24 applies similarly to the pressure control unit comprising sensor 64.

The apparatus may further comprise a second induced draft fan 90 operatively disposed to receive the second combustion product gas stream 78 from second reformer furnace 70. The second induced draft fan 90 may be the same make and model as the induced draft fan 50 or it may be a different make and/or model.

The apparatus may further comprise a sensor 75 that is responsive to pressure in the combustion space of the second reformer furnace 70. Controller 100 may be operatively connected to receive signals from sensor 75. Second induced draft fan 90 and/or second forced draft fan 60 may be operatively connected to controller 100 to receive signals from the controller 100 responsive to the signals from the sensor 75. Controller 100 may be configured to change the speed of the second induced draft fan 90 and/or the speed of second forced draft fan 60 responsive to changes in pressure in the combustion space of the second reformer furnace 70.

The apparatus may further comprise a sensor 92 that is responsive to oxygen concentration in the second combustion product gas stream 78 from the second reformer furnace 70. Controller 100 may be operatively connected to receive signals from sensor 92. Second induced draft fan 90 and/or second forced draft fan 60 may be operatively connected to controller 100 to receive signals from the controller 100 responsive to the signals from the sensor 92. Controller 100 may be configured to change the speed of the second induced draft fan 90 and/or the speed of second forced draft fan 60 responsive to changes in oxygen concentration of the second combustion product gas stream 78 from the second reformer furnace 70.

Control of forced draft fan 60 and induced fan 90 by controller 100 responsive to sensors 75 and 92 is like that described for corresponding forced draft fan 20, induced draft fan 50, and sensors 35 and 52.

As previously stated, the turbine exhaust gas and combustion air ducting may be designed to inherently provide an even split of the turbine exhaust gas to multiple reformers. When the reformers are operating at different production rates, however, it is desirable to split the exhaust gas flow to each reformer in proportion to the plants operating rates. This is accomplished by using a bias factor, calculated from the relative feed flow set point to each reformer, to offset the pressure controller set point of the forced draft fan. The bias factor will reduce the forced draft fan pressure set point of the higher operating rate reformer in order to lower the relative pressure in its combustion air flow path. As a result, a larger proportion of the turbine exhaust gas will flow to the higher operating rate reformer. The rate of change of the bias factor will be limited to ensure that the induced draft fan control can maintain a stable pressure and excess oxygen content in each reformer.

Figure 2:
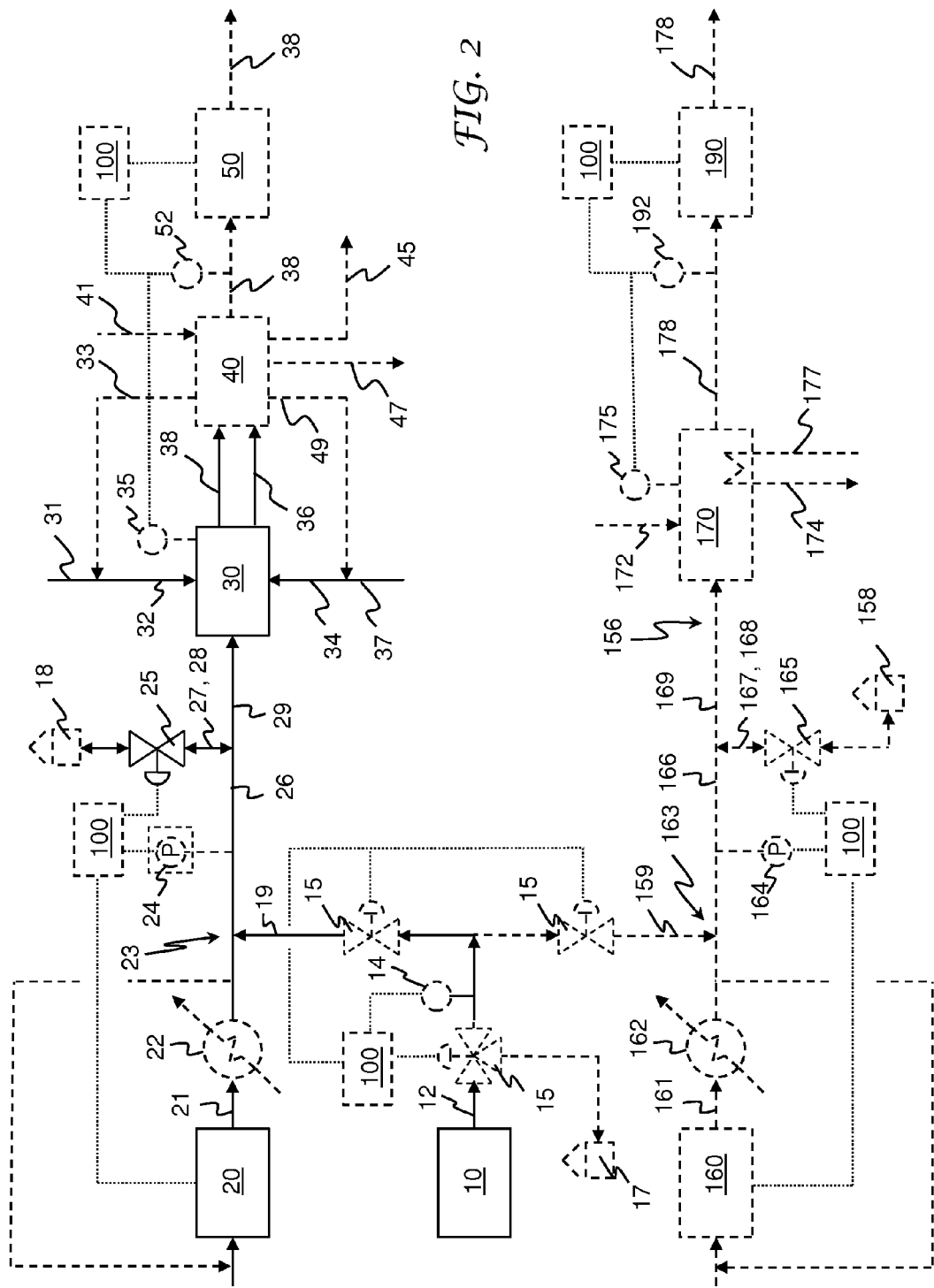
FIG. 2 is a process flow diagram illustrating an embodiment of the present invention with an optional heat recovery steam generator.

With reference to FIG. 2, the apparatus may comprise a forced draft fan 160 having an outlet for discharging an oxidant stream 161, a valve assembly 165 for providing a draft air stream 167, and a heat recovery steam generator (HRSG) 170 operatively connected to the gas turbine 10, the forced draft fan 160, and the valve assembly 165. The heat recovery steam generator 170, if present, is operatively disposed to receive a portion 159 of the exhaust stream 12 from the gas turbine 10, at least a portion of the oxidant stream 161 from the forced draft fan 160, and the draft air stream 167 from the valve assembly 165. The portion 159 of the exhaust stream 12 may be a divided portion.

Oxidant stream 161 may be blended with the portion 159 of the exhaust stream 12 at junction 163 to form a blended oxidant stream comprising gas turbine exhaust 166. Oxidant stream 161 may be blended with draft air stream 167 to form a blended oxidant stream comprising draft air 169.

Heat recovery steam generators and their operation are well-known in the art. Fuel 172 may be combusted with at least one of the blended oxidant stream comprising gas turbine exhaust 166 and the blended oxidant stream comprising draft air 169 in heat recovery steam generator 170. Water 177 may be heated in heat recovery steam generator 170 and the heated water and/or steam 174 may be passed to a steam drum to separate a steam product from water. The water from the steam drum may be recycled to the heat recovery steam generator 170 to generate more steam.

In embodiments with the HRSG, the apparatus may comprise a heat exchanger 162 operatively disposed between the forced draft fan 160 and the heat recovery steam generator 170. As shown in FIG. 2, the heat exchanger 162 is operatively disposed to receive the at least a portion of the oxidant stream 161 from the forced draft fan 160, and the heat recovery steam generator 170 is operatively disposed to receive at least a portion of the oxidant stream 161 from the heat exchanger 162.

Oxidant stream 161 may be heated in heat exchanger 162 by indirect heat transfer between the oxidant stream 161 and any suitable process stream having a temperature greater than the oxidant stream 161. Heat exchanger 162 may be operatively disposed to provide indirect heat transfer between at least a portion of the oxidant stream 161 and at least one of a portion or all of the combustion product gas stream from the reformer furnace (30) and a portion or all of the reformate stream from the plurality of catalyst-containing reformer tubes of the reformer furnace (30).

The apparatus may further comprise a conduit 156 operatively disposed to transport the portion 159 of the exhaust stream 12 from the gas turbine 10, the at least a portion of the oxidant stream 161 from the forced draft fan 160, and the draft air stream 167 from the valve assembly 165 to the heat recovery steam generator 170.

The apparatus may comprise a sensor 164 responsive to a pressure in the conduit 156. Controller 100 may be operatively connected to at least one of the valve assembly 165 for providing the draft air stream 167 and the valve assembly 15 for controlling the exhaust stream 12. Controller 100 may be operatively connected to the sensor 164 and responsive to signals from the sensor 164. Sensor 164 may be combined with a controller subunit to form a pressure control unit that receives control instructions from a master controller. The pressure control unit comprising sensor 164 may also be operatively connected to vary the fan speed of the forced draft fan 60. The discussion above regarding the operation of valve assembly 25 and the pressure control unit comprising sensor 24 applies similarly to valve assembly 165 and the pressure control unit comprising sensor 164.

The apparatus may further comprise induced draft fan 190 operatively disposed to receive exhaust stream 178 from the heat recovery steam generator 170.

The apparatus may further comprise a sensor 175 that is responsive to pressure in the heat recovery steam generator 170. Controller 100 may be operatively connected to receive signals from the sensor 175. Induced draft fan 190 and/or forced draft fan 160 may be operatively connected to controller 100 to receive signals from the controller 100 responsive to the signals from sensor 175. Controller 100 may be configured to change the speed of the induced draft fan 190 and/or the speed of forced draft fan 160 responsive to changes in pressure in the heat recovery steam generator 170. Induced draft fan 190 and/or forced draft fan 160 may thereby operate to control the pressure in the HRSG 170 in a similar manner to the manner in which induced draft fan 50 and/or forced draft fan 20 may operate to control the pressure in the reformer furnace 30.

The apparatus may further comprise a sensor 192 that is responsive to oxygen concentration in the exhaust stream 178 from the heat recovery steam generator 170. The controller 100 may be operatively connected to receive signals from sensor 192 that is responsive to oxygen concentration in the exhaust stream 178. Induced draft fan 190 and/or forced draft fan 160 may be operatively connected to controller 100 to receive signals from the controller 100 responsive to the signals from sensor 192. Controller 100 may be configured to change the speed of the induced draft fan 190 and/or the speed of forced draft fan 160 responsive to changes in oxygen concentration of the combustion product gas stream 178 from the heat recovery steam generator 170. Induced draft fan 190 and/or forced draft fan 160 may thereby operate to control the oxidant supply to the HRSG 170 in a similar manner to the manner in which induced draft fan 50 and/or forced draft fan 20 may operate to control the oxidant supply to the reformer furnace 30.

The present invention also relates to a process for producing a $H_2$-containing product. In the process, a purified hydrogen product may be produced (e.g. utilizing a $H_2$ PSA) and/or a synthesis gas product, which comprises $H_2$ and CO, may be produced. The process may be implemented using the apparatus for producing a $H_2$-containing product described above.

The process comprises a primary operating mode, and a secondary operating mode. The secondary operating mode commences when the exhaust stream 12 from the gas turbine 10 becomes interrupted or becomes otherwise unavailable. Detection of or identification of interruption of the exhaust stream may be by any means, for example, pressure measurement, flow measurement, and/or drop in electrical power generation.

The process is described with reference to the figures.

The primary operating mode comprises blending a first quantity of an oxidant stream 21 from forced draft fan 20 with a first quantity of at least a portion 19 of exhaust stream 12 from a gas turbine 10 to form a first quantity of a blended oxidant stream 26 comprising gas turbine exhaust. The first quantity of oxidant stream 21 may be passed from the forced draft fan 20 to heat exchanger 22 prior to blending the first quantity of the oxidant stream 21 from the forced draft fan 20 with the first quantity of at least a portion 19 of the exhaust stream 12 thereby heating the first quantity of the oxidant stream 21. The first quantity of blended oxidant stream 26 may comprise some draft air from valve assembly 25, but may primarily contain gas turbine exhaust and oxidant from the forced draft fan.

The primary operating mode comprises introducing a first quantity of a reformer feed gas stream 34 into a plurality of catalyst-containing reformer tubes in reformer furnace 30, reacting the first quantity of the reformer feed gas stream 34 in a reforming reaction under reaction conditions effective to form a first quantity of a reformate stream 36 comprising $H_2$, CO, $CH_4$, and $H_2O$, and withdrawing the first quantity of the reformate stream 36 from the plurality of catalyst-containing reformer tubes of the reformer furnace 30.

Persons skilled in the art know suitable reaction conditions for reforming. Reaction conditions effective to form a reformate stream from a reformer feed gas stream may include operating temperatures in the catalyst-containing reformer tubes ranging from 350° C. to 650° C. at the inlet and from 750° C. to 950° C. at the outlet, and operating pressures in the catalyst-containing reformer tubes ranging from 1 to 50 atm. These reaction conditions for forming a reformate stream from a reformer feed gas stream apply to all of the operating modes described herein.

Reformer feed gas stream may be formed from any suitable reformer feedstock known in the art and may be pre-reformed in a pre-reformer (not shown). The catalyst in the catalyst-containing reformer tubes may be any suitable reforming catalyst known in the art, for example, a nickel-based catalyst.

The primary operating mode comprises combusting a first quantity of fuel stream 32 with at least a portion of the first quantity of the blended oxidant stream comprising gas turbine exhaust 26 in reformer furnace 30 external to the plurality of catalyst-containing reformer tubes under conditions effective to combust the first quantity of the fuel stream 32 to form a first quantity of combustion product gas stream 38 and generate heat to supply energy for reacting the first quantity of the reformer feed gas stream 34 inside the plurality of catalyst-containing reformer tubes, and withdrawing the first quantity of the combustion product gas stream 38 from the reformer furnace 30. Conditions effective to combust the first quantity of the fuel stream may include any suitable temperature range and pressure range, for example, a temperature ranging from 600° C. to 1500° C. and a pressure ranging from 98 kPa to 102 kPa (absolute).

The fuel in fuel stream 32 may be any fuel known in the art. The fuel may comprise tail gas from a pressure swing adsorber where the pressure swing adsorber is used to separate the reformate stream 36 into a hydrogen product stream 45 and a tail gas stream 33. Fuel stream 32 may also comprise trim fuel 31, which may be natural gas.

The primary operating mode may comprise passing the first quantity of the combustion product gas stream 38 from reformer furnace 30 to induced draft fan 50. Induced draft fan 50 may be operated so that the pressure external to the plurality of catalyst-containing reformer tubes in the reformer furnace 30 (i.e. the combustion space) during the primary operating mode is within any suitable pressure range known for reformer furnaces. The pressure external to the plurality of catalyst-containing reformer tubes in the reformer furnace 30 (i.e. the combustion space) during the primary operating mode may range from −2.5 kPag (−10 inches $H_2O$) to +0.25 kPag (+1 inch of water) or may range from −1.5 kPag (−6 inches $H_2O$) to −0.5 kPag (−2 inches $H_2O$) or may range from −1 kPag (−4 inches $H_2O$) to −0.75 kPag (−3 inches $H_2O$).

The secondary operating mode comprises opening valve assembly 25 and blending a first quantity of draft air stream 27 with a second quantity of oxidant stream 21 to form a first quantity of a blended oxidant stream 29 comprising draft air.

The secondary operating mode comprises introducing a second quantity of the reformer feed gas stream 34 into the plurality of catalyst-containing reformer tubes in the reformer furnace 30, reacting the second quantity of the reformer feed gas stream 34 in a reforming reaction under reaction conditions effective to form a second quantity of the reformate stream 36 comprising $H_2$, CO, $CH_4$, and $H_2O$, and withdrawing the second quantity of the reformate stream 36 from the plurality of catalyst-containing reformer tubes of the reformer furnace 30.

The secondary operating mode comprises combusting a second quantity of the fuel stream 32 with at least a portion of the first quantity of the blended oxidant stream comprising draft air 29 in the reformer furnace 30 external to the plurality of catalyst-containing reformer tubes under conditions effective to combust the second quantity of the fuel stream 32 to form a second quantity of the combustion product gas stream 38 and generate heat to supply energy for reacting the second quantity of the reformer feed gas stream 34 inside the plurality of catalyst-containing reformer tubes, and withdrawing the second quantity of the combustion product gas stream 38 from first reformer furnace 30. Conditions effective to combust the second quantity of the fuel stream may include any suitable temperature range and pressure range, for example, a temperature ranging from 600° C. to 1500° C. and a pressure ranging from 98 kPa to 102 kPa (absolute).

The secondary operating mode may comprise passing the second quantity of the combustion product gas stream 38 from reformer furnace 30 to induced draft fan 50. Induced draft fan 50 may be operated so that the pressure external to the plurality of catalyst-containing reformer tubes in the reformer furnace 30 (i.e. the combustion space) during the secondary operating mode is within any suitable pressure range known for reformer furnaces. The pressure external to the plurality of catalyst-containing reformer tubes in the reformer furnace 30 (i.e. the combustion space) during the secondary operating mode may range from −2.5 kPag (−10 inches $H_2O$) to +0.25 kPag (+1 inch of water) or may range from −1.5 kPag (−6 inches $H_2O$) to −0.5 kPag (−2 inches $H_2O$) or may range from −1 kPag (−4 inches $H_2O$) to −0.75 kPag (−3 inches $H_2O$).

At the start of the secondary operating mode, the valve assembly 25 may be opened to a predetermined position. The predetermined position may depend upon the operating rate of the gas turbine prior to the start of the secondary operating mode. The operating rate of the gas turbine may be characterized, for example, by any of one or more flow rates into or out of the gas turbine and/or a shaft speed of the gas turbine. By opening the valve assembly 25 to a predetermined position, the process can quickly provide the required amount of oxidant from the draft air to make up for the deficiency due to the loss gas turbine exhaust as oxidant for combustion. Quickly making up the for the loss of combustion oxidant can prevent a "trip" or undesired shutdown of reformer furnace 30.

Oxidant stream 21 (first quantity, second quantity, or other quantity) may be heated in heat exchanger 22 by indirect heat transfer with a portion or all of the combustion product gas stream 38 from reformer furnace 30 and/or a portion or all of the reformate stream 36 from the plurality of catalyst-containing reformer tubes of reformer furnace 30.

Indirect heat transfer between the combustion product gas 38 and the oxidant stream 21 may be realized by passing the combustion product gas 38 in indirect heat transfer relationship with oxidant stream 21 in heat exchanger 22. Indirect heat transfer between combustion product gas 38 and oxidant stream 21 may be realized by use of a working fluid, for example, water/steam from the steam generation system. For example, heat may be transferred from combustion product gas 38 to boiler feed water to generate hot boiler feed water and/or steam, and the hot boiler feed water and/or steam used to heat oxidant stream 21 in heat exchanger 22.

Indirect heat transfer between reformate 36 and the oxidant stream 21 may be realized by passing reformate 36 in indirect heat transfer relationship with the oxidant stream 21 in the heat exchanger 22. Indirect heat transfer between reformate 36 and oxidant stream 21 may be realized by use of a working fluid, for example, water/steam from the steam generation system. For example, heat may be transferred from reformate 36 to boiler feed water to generate hot boiler feed water and/or steam, and the hot boiler feed water and/or steam used to heat the oxidant stream 21 in heat exchanger 22.

The process may comprise a tertiary operating mode that commences subsequent to the secondary operating mode. Like the secondary operating mode, the tertiary operating mode is performed when the exhaust stream from the gas turbine is unavailable. During the tertiary operating mode, the speed of the forced draft fan 20 is increased so that the resulting blended oxidant stream 29 comprises a greater mass ratio of oxidant stream 21 to draft air stream 27 compared to the mass ratio during the secondary operating mode. This may be particularly important for the case where the oxidant stream 21 is heated in heat exchanger 22.

The tertiary operating mode comprises partially closing the valve assembly 25 and blending a second quantity of the draft air stream 27 with a third quantity of the oxidant stream 21 to form a second quantity of the blended oxidant stream comprising draft air 29. The third quantity of the oxidant stream 21 from the forced draft fan 20 may be passed to heat exchanger 22 prior blending the second quantity of the draft air stream 27 with the third quantity of the oxidant stream 21 thereby heating the third quantity of the oxidant stream 21 from the forced draft fan 20.

The tertiary operating mode comprises introducing a third quantity of the reformer feed gas stream 34 into the plurality of catalyst-containing reformer tubes in the reformer furnace 30, reacting the third quantity of the reformer feed gas stream 34 under reaction conditions effective to form a third quantity of the reformate stream 36 comprising $H_2$, CO, $CH_4$, and $H_2O$, and withdrawing the third quantity of the reformate stream 36 from the plurality of catalyst-containing reformer tubes of the reformer furnace 30.

The tertiary operating mode comprises combusting a third quantity of the fuel stream 32 with at least a portion of the second quantity of the blended oxidant stream comprising draft air 29 in reformer furnace 30 external to the plurality of catalyst-containing reformer tubes under conditions effective to combust the third quantity of the fuel stream 32 to form a third quantity of the combustion product gas stream 38 and generate heat to supply energy for reacting the third quantity of the reformer feed gas stream 34 inside the plurality of catalyst-containing reformer tubes, and withdrawing the third quantity of the combustion product gas stream 38 from the reformer furnace 30. Conditions effective to combust the third quantity of the fuel stream may include any suitable temperature range and pressure range, for example, a temperature ranging from 600° C. to 1500° C. and a pressure ranging from 98 kPa to 102 kPa (absolute).

The tertiary operating mode is characterized by $F_3 > F_1$, $F_3 > F_2$, and $G_1 > G_2$ where $F_1$ is the time-averaged mass flow rate of the first quantity of the oxidant stream, $F_2$ is the time-averaged mass flow rate of the second quantity of the oxidant stream, $F_3$ is the time-averaged mass flow rate of the third quantity of the oxidant stream, $G_1$ is the time-averaged mass flow rate of the first quantity of the draft air stream, and $G_2$ is the time-averaged mass flow rate of the second quantity of the draft air stream Time-averaged mass flow rates are calculated in the conventional way from the generalized equation:

$$\bar{\xi} = \frac{1}{\tau}\int_{t_1}^{t_2} \xi(t)dt$$

where $\bar{\xi}$ is the time-averaged mass flow rate, $\xi$ is the instantaneous mass flow rate, t is time, where the specified quantity (i.e. first, second, third, etc.) flows from $t=t_1$ to $t=t_2$, where $t=t_1$ at the beginning of the flow of the specified quantity, $t=t_2$ at the end of the flow of the specified quantity, and where $\tau = t_2 - t_1$.

The tertiary operating mode may comprise passing the third quantity of the combustion product gas stream 38 from reformer furnace 30 to induced draft fan 50. Induced draft fan 50 may be operated so that the pressure external to the plurality of catalyst-containing reformer tubes in the reformer furnace 30 (i.e. the combustion space) during the tertiary operating mode is within any suitable pressure range known for reformer furnaces. The pressure external to the plurality of catalyst-containing reformer tubes in the reformer furnace 30 (i.e. the combustion space) during the tertiary operating mode may range from −2.5 kPag (−10 inches $H_2O$) to +0.25 kPag (+1 inch of water) or may range from −1.5 kPag (−6 inches $H_2O$) to −0.5 kPag (−2 inches $H_2O$) or may range from −1 kPag (−4 inches $H_2O$) to −0.75 kPag (−3 inches $H_2O$).

In case of a sudden surge of oxidant gas from the forced draft fan 20 and/or gas turbine exhaust from the gas turbine, the process may respond by venting a portion of the blended oxidant stream 26 through the valve assembly 25 in a vent mode.

The vent mode comprises blending a fourth quantity of the oxidant stream from the forced draft fan 20 with a second quantity of at least a portion 19 of the exhaust stream 12 from the gas turbine 10 to form a second quantity of the blended oxidant stream comprising gas turbine exhaust 26, and opening valve assembly 25 and discharging a first portion of the second quantity of the blended oxidant stream 26 through vent 18 as vent stream 28. The fourth quantity of the oxidant stream 21 from the forced draft fan 20 may be passed to the heat exchanger 22 prior to blending the fourth quantity of the oxidant stream with the second quantity of at least a portion of the exhaust stream from the gas turbine thereby heating the fourth quantity of the oxidant stream from the forced draft fan 20.

The vent mode also comprises introducing a fourth quantity of the reformer feed gas stream 34 into the plurality of catalyst-containing reformer tubes in the reformer furnace 30, reacting the fourth quantity of the reformer feed gas stream 34 under reaction conditions effective to form a fourth quantity of the reformate stream 36 comprising $H_2$, CO, $CH_4$, and $H_2O$, and withdrawing the fourth quantity of the reformate stream 36 from the plurality of catalyst-containing reformer tubes of the reformer furnace 30.

The vent mode also comprises combusting a fourth quantity of the fuel stream 32 with a second portion of the second quantity of the blended oxidant stream comprising gas turbine exhaust 26 in the reformer furnace 30 external to the plurality of catalyst-containing reformer tubes under conditions effective to combust the fourth quantity of the fuel stream 32 to form a fourth quantity of the combustion product gas stream 38 and generate heat to supply energy for reacting the fourth quantity of the reformer feed gas stream 34 inside the plurality of catalyst-containing reformer tubes of the reformer, and withdrawing the fourth quantity of the combustion product gas stream 38 from the reformer furnace 30. Conditions effective to combust the fourth quantity of the fuel stream may include any suitable temperature range and pressure range, for example, a temperature ranging from 600° C. to 1500° C. and a pressure ranging from 98 kPa to 102 kPa (absolute).

The process may also comprise a gas turbine start-up mode. The gas start-up mode comprises passing a start-up quantity of the exhaust stream 12 from the gas turbine 10 to valve assembly 15. During the gas turbine start-up mode, valve assembly 15 discharges the start-up quantity of the exhaust stream through a gas turbine exhaust vent 17. As a result, no portion of the start-up quantity of the exhaust stream 12 is used as an oxidant for combustion in the first reformer furnace 30 or other reformer furnace.

In any of the modes where a reformate stream 36 is produced, the process may comprise additional steps for processing the reformate stream 36 and the combustion product gas stream 38 in processing unit 40. Any of the conventional steps known for processing the reformate stream 36 and combustion product gas stream 38 are contemplated.

Processing unit 40 may include one or more shift reactors where the reformate is shifted to produce more hydrogen in the reformation. $CO_2$ may be removed from the reformate in a $CO_2$ removal unit and a $CO_2$ by-product stream 47 may be withdrawn from processing unit 40. Processing unit 40 may include a pressure swing adsorber where the reformate stream is separated to produce a hydrogen product stream 45 and a tail gas 33, which may be used as a fuel in reformer furnace 30. Make-up water stream 41 may be introduced into processing unit 40 to make steam 49 from heat recovered from the reformate stream 36 and/or the combustion product stream 38. The steam stream 49 may be combined with hydrocarbon feedstock stream 37 to form reformer feed stream 34.

The process may further comprise a heat exchanger start-up mode that may be particularly suitable in cold climates. During the heat exchanger start-up mode a portion 11 of the oxidant stream 21 after being heated in heat exchanger 22 is recycled to an inlet of the forced draft fan 20. A sufficient quantity of the oxidant stream 21 is recycled to raise the temperature in heat exchanger 22 above freezing or other predetermined target temperature. A portion 11 of heated oxidant gas stream 21 is recycled to prevent freezing in heat exchanger 22 if the heating medium is water. Recycling a portion 11 of heated oxidant gas stream 21 may also be done to help prevent cold corner corrosion of the heat exchanger 22.

The process may include process steps utilizing a second reformer furnace and will be described with reference to FIG. 1.

For embodiments with a second reformer furnace 70, the primary operating mode further comprises blending a first quantity of oxidant stream 61 from forced draft fan 60 with a first quantity of portion 59 of exhaust stream 12 from gas turbine 10 to form a first quantity of blended oxidant stream 66 comprising gas turbine exhaust. The first quantity of oxidant stream 61 may be passed from the forced draft fan 60 to heat exchanger 62 prior to blending the first quantity of the oxidant stream 61 from forced draft fan 60 with the first quantity of portion 59 of the exhaust stream 12 thereby heating the first quantity of oxidant stream 61. The first quantity of blended oxidant stream 66 may comprise some draft air from valve assembly 65, but may primarily contain gas turbine exhaust and oxidant from the forced draft fan 60.

The primary operating mode with the second reformer furnace 70 comprises introducing a first quantity of a reformer feed gas stream 74 into a plurality of catalyst-containing reformer tubes in reformer furnace 70, reacting the first quantity of the reformer feed gas stream 74 in a reforming reaction under reaction conditions effective to form a first quantity of a reformate stream 76 comprising $H_2$, CO, $CH_4$, and $H_2O$, and withdrawing the first quantity of the reformate stream 76 from the plurality of catalyst-containing reformer tubes of the reformer furnace 70. Reformer feed gas stream 74 may be formed from steam and any suitable hydrocarbon feedstock known in the art and may be pre-reformed in a pre-reformer (not shown). The catalyst in the catalyst-containing reformer tubes may be any suitable reforming catalyst known in the art, for example, a nickel-based catalyst.

The primary operating mode with the second reformer furnace 70 comprises combusting a first quantity of fuel stream 72 with at least a portion of the first quantity of the blended oxidant stream comprising gas turbine exhaust 66 in reformer furnace 70 external to the plurality of catalyst-containing reformer tubes under conditions effective to combust the first quantity of the fuel stream 72 to form a first quantity of combustion product gas stream 78 and generate heat to supply energy for reacting the first quantity of the reformer feed gas stream 74 inside the plurality of catalyst-containing reformer tubes, and withdrawing the first quantity of the combustion product gas stream 78 from the reformer furnace 70. Conditions effective to combust the first quantity of the fuel stream 72 may include any suitable temperature range and pressure range, for example, a temperature ranging from 600° C. to 1500° C. and a pressure ranging from 98 kPa to 102 kPa (absolute).

The fuel in fuel stream 72 may be any fuel known in the art. The fuel may comprise tail gas from a pressure swing adsorber where the pressure swing adsorber is used to separate the reformate stream 76 into a hydrogen product stream 85 and a tail gas stream 73. Fuel stream 72 may also comprise trim fuel 71, which may be natural gas.

The primary operating mode with the second reformer furnace 70 comprises passing the first quantity of the combustion product gas stream 78 from reformer furnace 70 to induced draft fan 90. Induced draft fan 90 may be operated so that the pressure external to the plurality of catalyst-containing reformer tubes in the reformer furnace 70 (i.e. the combustion space) during the primary operating mode is within any suitable pressure range known for reformer furnaces. The pressure external to the plurality of catalyst-containing reformer tubes in the reformer furnace 70 (i.e. the combustion space) during the primary operating mode may range from −2.5 kPag (−10 inches $H_2O$) to +0.25 kPag (+1 inch of water) or may range from −1.5 kPag (−6 inches $H_2O$) to −0.5 kPag (−2 inches $H_2O$) or may range from −1 kPag (−4 inches $H_2O$) to −0.75 kPag (−3 inches $H_2O$).

The secondary operating mode with the second reformer furnace 70 comprises opening valve assembly 65 and blending a first quantity of draft air stream 67 with a second quantity of oxidant stream 61 to form a first quantity of a blended oxidant stream 69 comprising draft air.

The secondary operating mode with the second reformer furnace 70 comprises introducing a second quantity of the reformer feed gas stream 74 into the plurality of catalyst-containing reformer tubes in reformer furnace 70, reacting the second quantity of the reformer feed gas stream 74 in a reforming reaction under reaction conditions effective to form a second quantity of the reformate stream 76 comprising $H_2$, CO, $CH_4$, and $H_2O$, and withdrawing the second quantity of the reformate stream 76 from the plurality of catalyst-containing reformer tubes of the reformer furnace 70.

The secondary operating mode with the second reformer furnace 70 comprises combusting a second quantity of the fuel stream 72 with at least a portion of the first quantity of the blended oxidant stream comprising draft air 69 in the reformer furnace 70 external to the plurality of catalyst-containing reformer tubes under conditions effective to combust the second quantity of the fuel stream 72 to form a second quantity of the combustion product gas stream 78 and generate heat to supply energy for reacting the second quantity of the reformer feed gas stream 74 inside the plurality of catalyst-containing reformer tubes, and withdrawing the second quantity of the combustion product gas stream 78 from first reformer furnace 70. Conditions effective to combust the second quantity of the fuel stream may include any suitable temperature range and pressure range, for example, a temperature ranging from 600° C. to 1500° C. and a pressure ranging from 98 kPa to 102 kPa (absolute).

The secondary operating mode with the second reformer furnace 70 may comprise passing the second quantity of the combustion product gas stream 78 from reformer furnace 70 to induced draft fan 90. Induced draft fan 90 may be operated so that the pressure external to the plurality of catalyst-containing reformer tubes in the reformer furnace 70 (i.e. the combustion space) during the secondary operating mode is within any suitable pressure range known for reformer furnaces. The pressure external to the plurality of catalyst-containing reformer tubes in the reformer furnace 70 (i.e. the combustion space) during the secondary operating mode may range from −2.5 kPag (−10 inches $H_2O$) to +0.25 kPag (+1 inch of water) or may range from −1.5 kPag (−6 inches $H_2O$) to −0.5 kPag (−2 inches $H_2O$) or may range from −1 kPag (−4 inches $H_2O$) to −0.75 kPag (−3 inches $H_2O$).

At the start of the secondary operating mode, the valve assembly 65 may be opened to a predetermined position. The predetermined position may depend upon the operating rate of the gas turbine 10 prior to the start of the secondary operating mode. The operating rate of the gas turbine 10 may be characterized, for example, by any of one or more flow rates into or out of the gas turbine 10 and/or a shaft speed of the gas turbine. By opening the valve assembly 65 to a predetermined position, the process can quickly provide the required amount of oxidant from the draft air to make up for the deficiency due to the loss gas turbine exhaust as oxidant for combustion. Quickly making up for the loss of combustion oxidant can prevent a "trip" or undesired shutdown of reformer furnace 70.

Oxidant stream 61 (first quantity, second quantity, or other quantity) may be heated in heat exchanger 62 by indirect heat transfer with a portion or all of the combustion product gas stream 78 from reformer furnace 70 and/or a portion or all of the reformate stream 76 from the plurality of catalyst-containing reformer tubes of reformer furnace 70.

Indirect heat transfer between the combustion product gas 78 and the oxidant stream 61 may be realized by passing the combustion product gas 78 in indirect heat transfer relationship with oxidant stream 61 in heat exchanger 62. Indirect heat transfer between combustion product gas 78 and oxidant stream 61 may be realized by use of a working fluid, for example, water/steam from the steam generation system. For example, heat may be transferred from combustion product gas 78 to boiler feed water to generate hot boiler feed water and/or steam, and the hot boiler feed water and/or steam used to heat oxidant stream 61 in heat exchanger 62.

Indirect heat transfer between reformate 76 and the oxidant stream 61 may be realized by passing reformate 76 in indirect heat transfer relationship with the oxidant stream 61 in the heat exchanger 62. Indirect heat transfer between reformate 76 and oxidant stream 61 may be realized by use of a working fluid, for example, water/steam from the steam generation system. For example, heat may be transferred from reformate 76 to boiler feed water to generate hot boiler feed water and/or steam, and the hot boiler feed water and/or steam used to heat the oxidant stream 61 in heat exchanger 62.

As described above the tertiary operating mode is also performed when the exhaust stream 12 from the gas turbine is unavailable. During the tertiary operating mode with the second reformer furnace 70, the speed of the forced draft fan 60 is increased so that the resulting blended oxidant stream 69 comprises a greater mass ratio of oxidant stream 61 to draft air stream 67 compared to the mass ratio during the secondary operating mode. This may be particularly important for the case where the oxidant stream 61 is heated in heat exchanger 62.

The tertiary operating mode with the second reformer furnace 70 comprises partially closing the valve assembly 65 and blending a second quantity of the draft air stream 67 with a third quantity of the oxidant stream 61 to form a second quantity of the blended oxidant stream comprising draft air 69. The third quantity of the oxidant stream 61 from the forced draft fan 60 may be passed to heat exchanger 62 prior blending the second quantity of the draft air stream 67 with the third quantity of the oxidant stream 61 thereby heating the third quantity of the oxidant stream 61 from the forced draft fan 60.

The tertiary operating mode with the second reformer furnace 70 comprises introducing a third quantity of the reformer feed gas stream 74 into the plurality of catalyst-containing reformer tubes in the reformer furnace 70, reacting the third quantity of the reformer feed gas stream 74 under reaction conditions effective to form a third quantity of the reformate stream 76 comprising $H_2$, CO, $CH_4$, and $H_2O$, and withdrawing the third quantity of the reformate stream 76 from the plurality of catalyst-containing reformer tubes of the reformer furnace 70.

The tertiary operating mode with the second reformer furnace 70 comprises combusting a third quantity of the fuel stream 72 with at least a portion of the second quantity of the blended oxidant stream comprising draft air 69 in reformer furnace 70 external to the plurality of catalyst-containing reformer tubes under conditions effective to combust the third quantity of the fuel stream 72 to form a third quantity of the combustion product gas stream 78 and generate heat to supply energy for reacting the third quantity of the reformer feed gas stream 74 inside the plurality of catalyst-containing reformer tubes, and withdrawing the third quantity of the combustion product gas stream 78 from the reformer furnace 70. Conditions effective to combust the third quantity of the fuel stream may include any suitable temperature range and pressure range, for example, a temperature ranging from 600° C. to 1500° C. and a pressure ranging from 98 kPa to 102 kPa (absolute).

The tertiary operating mode with the second reformer furnace 70 may be characterized by $F_6 > F_4$, $F_6 > F_5$, and $G_3 > G_4$ where $F_4$ is the time-averaged mass flow rate of the first quantity of the oxidant stream, $F_5$ is the time-averaged mass flow rate of the second quantity of the oxidant stream, $F_6$ is the time-averaged mass flow rate of the third quantity of the oxidant stream, $G_3$ is the time-averaged mass flow rate of the first quantity of the draft air stream, and $G_4$ is the time-averaged mass flow rate of the second quantity of the draft air stream The tertiary operating mode with the second reformer furnace 70 may comprise passing the third quantity of the combustion product gas stream 78 from reformer furnace 70 to induced draft fan 90. Induced draft fan 90 may be operated so that the pressure external to the plurality of catalyst-containing reformer tubes in the reformer furnace 70 (i.e. the combustion space) during the tertiary operating mode is within any suitable pressure range known for reformer furnaces. The pressure external to the plurality of catalyst-containing reformer tubes in the reformer furnace 30 (i.e. the combustion space) during the tertiary operating mode may range from −2.5 kPag (−10 inches $H_2O$) to +0.25 kPag (+1 inch of water) or may range from −1.5 kPag (−6 inches $H_2O$) to −0.5 kPag (−2 inches $H_2O$) or may range from −1 kPag (−4 inches $H_2O$) to −0.75 kPag (−3 inches $H_2O$).

In case of a sudden surge of oxidant gas from the forced draft fan 60 and/or gas turbine exhaust from the gas turbine 10, the process may respond by venting a portion of the blended oxidant stream 66 through the valve assembly 65 in a vent mode.

The vent mode with the second reformer furnace 70 comprises blending a fourth quantity of the oxidant stream 61 from the forced draft fan 60 with a second quantity of portion 59 of the exhaust stream 12 from the gas turbine 10 to form a second quantity of the blended oxidant stream comprising gas turbine exhaust 66, and opening valve assembly 65 and discharging a first portion of the second quantity of the blended oxidant stream 66 through vent 58 as vent stream 68. The fourth quantity of the oxidant stream 61 from the forced draft fan 60 may be passed to the heat exchanger 62 prior to blending the fourth quantity of the oxidant stream with the second quantity of portion 59 of the exhaust stream 12 from the gas turbine 10 thereby heating the fourth quantity of the oxidant stream 61 from the forced draft fan 60.

The vent mode with the second reformer furnace 70 also comprises introducing a fourth quantity of the reformer feed gas stream 74 into the plurality of catalyst-containing reformer tubes in the reformer furnace 70, reacting the fourth quantity of the reformer feed gas stream 74 under reaction conditions effective to form a fourth quantity of the reformate stream 76 comprising $H_2$, CO, $CH_4$, and $H_2O$, and withdrawing the fourth quantity of the reformate stream 76 from the plurality of catalyst-containing reformer tubes of the reformer furnace 70.

The vent mode with the second reformer furnace 70 also comprises combusting a fourth quantity of the fuel stream 72 with a second portion of the second quantity of the blended oxidant stream comprising gas turbine exhaust 66 in the reformer furnace 70 external to the plurality of catalyst-containing reformer tubes under conditions effective to combust the fourth quantity of the fuel stream 72 to form a fourth quantity of the combustion product gas stream 78 and generate heat to supply energy for reacting the fourth quantity of the reformer feed gas stream 74 inside the plurality of catalyst-containing reformer tubes of the reformer 70, and withdrawing the fourth quantity of the combustion product gas stream 78 from the reformer furnace 70. Conditions effective to combust the fourth quantity of the fuel stream may include any suitable temperature range and pressure range, for example, a temperature ranging from 600° C. to 1500° C. and a pressure ranging from 98 kPa to 102 kPa (absolute).

Embodiments with the heat recovery heat exchanger 170 may also include a vent mode where a vent stream 168 is discharged through vent 158 from valve assembly 65.

The heat exchanger start-up mode may apply equally to forced draft fan 60 and heat exchanger 62.

The process may further comprise one or more turndown modes.

In one variation of the turndown mode with two reformers, one of the reformer furnaces is put into an idle mode where essentially no reformer feed gas 34 is reacted in the catalyst-containing tubes while the other reformer furnace produces reformate. A turndown to 50% of standard capacity is easily provided for this variation. The second reformer furnace can be further turned down to about 80% of standard capacity, resulting in a relative turndown to 40% of standard capacity. Oxidant supply during any turndown mode may come from the gas turbine exhaust or the corresponding forced draft fan as desired.

EXAMPLES

Example 1

Without Valve Assembly 25

In example 1, 40% of the molar oxygen flow of combustion oxidant is initially provided by gas turbine exhaust 19 and 60% of the molar flow of oxygen is provided from the forced draft fan 20.

Without valve assembly 25, the time required for the forced draft fan 20 to respond to an unexpected loss of gas turbine exhaust and provide sufficient oxidant to the reformer furnace 30 for combustion is about 15 seconds. The time required to respond with sufficient oxidant may be calculated from the speed of response of a viscous coupling drive using the assumption that it is initially at a normal speed for the primary mode. Lack of sufficient combustion oxidant for 15 seconds will cause the reformer furnace to shut down due to low pressure or loss of flames in the furnace combustion space.

Example 2

With Valve Assembly 25

In example 2, 40% of the molar oxygen flow of combustion oxidant is initially provided by gas turbine exhaust 19 and 60% of the molar flow of oxygen is provided from the forced draft fan 20.

With valve assembly 25 using a damper assembly, the time required to provide sufficient oxidant to the reformer furnace for combustion using draft air when the system unexpectedly loses gas turbine exhaust is about 2 seconds as determined by an analysis of flow achievable for full closed position to full open position of the valve assembly 25. Lack of sufficient combustion oxidant for 2 seconds will not cause the reformer furnace to shut down because the pressure and oxidant flow rate can be sufficiently maintained as turbine exhaust decays to prevent low furnace pressure and loss of flames in the furnace.

The invention claimed is:

1. An apparatus for producing a $H_2$-containing product, the apparatus comprising:
   a gas turbine having an outlet for withdrawing an exhaust stream from the gas turbine;
   a forced draft fan having an outlet for discharging an oxidant stream;
   a valve assembly for providing a draft air stream;
   a reformer furnace operatively connected to the gas turbine, the forced draft fan, and the valve assembly, and operatively disposed to receive at least a portion of the exhaust stream from the gas turbine, at least a portion of the oxidant stream from the forced draft fan, and the draft air stream from the valve assembly; and
   a heat exchanger operatively disposed between the forced draft fan and the reformer furnace, wherein the heat exchanger is operatively disposed to receive the at least a portion of the oxidant stream from the forced draft fan, and the reformer furnace is operatively disposed to receive the at least a portion of the oxidant stream from the heat exchanger.

2. The apparatus of claim 1 further comprising:
   an induced draft fan operatively disposed to receive a combustion product gas stream from the reformer furnace.

3. The apparatus of claim 1 further comprising:
a conduit operatively disposed to transport the at least a portion of the exhaust stream from the gas turbine, the at least a portion of the oxidant stream from the forced draft fan, and the draft air stream from the valve assembly to the reformer furnace;
a sensor responsive to a pressure in the conduit; and
a controller operatively connected to at least one of the valve assembly for providing the draft air stream and the valve assembly for controlling the exhaust stream, the controller operatively connected to the sensor and responsive to signals from the sensor.

4. The apparatus of claim 1 further comprising:
a pressure swing adsorption unit operatively disposed to receive a reformate stream from the reformer to form a hydrogen product stream and a by-product stream from the reformate stream.

5. The apparatus of claim 1 further comprising:
a second forced draft fan having an outlet for discharging a second oxidant stream;
a second valve assembly for providing a second draft air stream; and
a second reformer furnace operatively connected to the gas turbine, the second forced draft fan, and the second valve assembly, and operatively disposed to receive a second portion of the exhaust stream from the gas turbine, at least a portion of the second oxidant stream from the second forced draft fan, and the second draft air stream from the second valve assembly; and
a second heat exchanger operatively disposed between the second forced draft fan and the second reformer furnace, wherein the second heat exchanger is operatively disposed to receive the at least a portion of the second oxidant stream from the second forced draft fan, and the second reformer furnace is operatively disposed to receive the at least a portion of the second oxidant stream from the second heat exchanger.

6. The apparatus according to claim 5 wherein the second reformer furnace comprises a plurality of catalyst-containing reformer tubes wherein the plurality of catalyst-containing reformer tubes of the second reformer furnace are operatively disposed to receive a second reformer feed gas stream and the second reformer furnace is operatively disposed to receive the second portion of the exhaust stream, the at least a portion of the second oxidant stream, the second draft air stream, and a second fuel stream for combustion thereof in a combustion space external to the plurality of catalyst-containing reformer tubes of the second reformer furnace, wherein the second reformer furnace has a first outlet for withdrawing a second reformate stream formed from the second reformer feed gas stream in the plurality of catalyst-containing reformer tubes of the second reformer furnace, and wherein the second reformer furnace has a second outlet for withdrawing a second combustion product gas stream from the combustion space of the second reformer furnace, the second combustion product gas stream formed by the combustion of the second fuel stream;
the apparatus further comprising:
a second induced draft fan operatively disposed to receive the second combustion product gas stream from the second reformer furnace;
a valve assembly for controlling the exhaust stream from the gas turbine, the valve assembly operative to control the flow rate of the at least a portion of the exhaust stream and operative to control the flow rate of the second portion of the exhaust stream;
a second conduit operatively disposed to transport the second portion of the exhaust stream from the gas turbine, the at least a portion of the second oxidant stream from the second forced draft fan, and the second draft air stream from the second valve assembly to the second reformer furnace;
a second sensor responsive to a pressure in the second conduit;
a controller operatively connected to at least one of the second valve assembly for providing the second draft air stream and the valve assembly for controlling the exhaust stream, the controller operatively connected to the second sensor and responsive to signals from the second sensor;
a pressure swing adsorption unit operatively disposed to receive the second reformate stream to form a second hydrogen product stream and a second by-product stream from the reformate stream; and
one or more sensors wherein the one or more sensors are at least one of a sensor that is responsive to pressure in the combustion space of the second reformer furnace, and a sensor that is responsive to oxygen concentration in the combustion product gas stream from the second reformer furnace wherein the controller is operatively connected to receive signals from the one or more sensors;
wherein the induced draft fan is operatively connected to receive signals from the controller responsive to the signals from the one or more sensors.

7. The apparatus of claim 1 wherein the reformer furnace comprises a plurality of catalyst-containing reformer tubes wherein the plurality of catalyst-containing reformer tubes are operatively disposed to receive a reformer feed gas stream and the reformer furnace is operatively disposed to receive the at least a portion of the exhaust stream, the at least a portion of the oxidant stream, the draft air stream, and a fuel stream for combustion thereof in a combustion space external to the plurality of catalyst-containing reformer tubes, wherein the reformer furnace has a first outlet for withdrawing a reformate stream formed from the reformer feed gas stream in the plurality of catalyst-containing reformer tubes, and wherein the reformer furnace has a second outlet for withdrawing a combustion product gas stream from the combustion space, the combustion product gas stream formed by the combustion of the fuel stream.

8. The apparatus of claim 7 further comprising:
an induced draft fan operatively disposed to receive a combustion product gas stream from the reformer furnace;
one or more sensors wherein the one or more sensors are at least one of a sensor that is responsive to pressure in the combustion space of the reformer furnace, and a sensor that is responsive to oxygen concentration in the combustion product gas stream from the reformer furnace; and
a controller operatively connected to receive signals from the one or more sensors;
wherein the induced draft fan is operatively connected to receive signals from the controller responsive to the signals from the one or more sensors.

9. A process for producing a $H_2$-containing product, the process comprising:
a primary operating mode, the primary operating mode comprising:
passing a first quantity of an oxidant stream from a forced draft fan to a heat exchanger thereby heating the first quantity of the oxidant stream from the forced draft fan in the heat exchanger;

blending the first quantity of the oxidant stream from the forced draft fan, after being heated in the heat exchanger, with a first quantity of at least a portion of an exhaust stream from a gas turbine to form a first quantity of a blended oxidant stream comprising gas turbine exhaust;

introducing a first quantity of a reformer feed gas stream into a plurality of catalyst-containing reformer tubes in a reformer furnace, reacting the first quantity of the reformer feed gas stream in a reforming reaction under reaction conditions effective to form a first quantity of a reformate stream comprising $H_2$, CO, $CH_4$, and $H_2O$, and withdrawing the first quantity of the reformate stream from the plurality of catalyst-containing reformer tubes of the reformer furnace; and combusting a first quantity of a fuel stream with at least a portion of the first quantity of the blended oxidant stream comprising gas turbine exhaust in the reformer furnace external to the plurality of catalyst-containing reformer tubes under conditions effective to combust the first quantity of the fuel stream to form a first quantity of a combustion product gas stream and generate heat to supply energy for reacting the first quantity of the reformer feed gas stream inside the plurality of catalyst-containing reformer tubes, and withdrawing the first quantity of the combustion product gas stream from the reformer furnace; and a secondary operating mode, the secondary operating mode commencing when the exhaust stream from the gas turbine becomes unavailable, the secondary operating mode comprising:

passing a second quantity of the oxidant stream from the first draft fan to the heat exchanger thereby heating the second quantity of the oxidant stream from the forced draft fan in the heat exchanger;

opening a valve assembly and blending the second quantity of the oxidant stream from the draft fan, after being heated in the heat exchanger, with a first quantity of a draft air stream from the valve assembly with to form a first quantity of a blended oxidant stream comprising draft air;

introducing a second quantity of the reformer feed gas stream into the plurality of catalyst-containing reformer tubes in the reformer furnace, reacting the second quantity of the reformer feed gas stream in the reforming reaction under reaction conditions effective to form a second quantity of the reformate stream comprising $H_2$, CO, $CH_4$, and $H_2O$, and withdrawing the second quantity of the reformate stream from the plurality of catalyst-containing reformer tubes of the reformer furnace; and combusting a second quantity of the fuel stream with at least a portion of the first quantity of the blended oxidant stream comprising draft air in the reformer furnace external to the plurality of catalyst-containing reformer tubes under conditions effective to combust the second quantity of the fuel stream to form a second quantity of the combustion product gas stream and generate heat to supply energy for reacting the second quantity of the reformer feed gas stream inside the plurality of catalyst-containing reformer tubes, and withdrawing the second quantity of the combustion product gas stream from first reformer furnace.

10. The process of claim 9 wherein at the start of the secondary operating mode, the valve assembly is opened to a predetermined position, the predetermined position depending upon an operating rate of the gas turbine prior to the start of the secondary operating mode.

11. The process of claim 9
wherein the reformer furnace has a pressure external to the plurality of catalyst-containing reformer tubes;
wherein the primary operating mode further comprises passing the first quantity of the combustion product gas stream from the reformer furnace to an induced draft fan, where the induced draft fan is operated so that the pressure external to the plurality of catalyst-containing reformer tubes in the reformer furnace ranges from −2.5 kPag (−10 inches $H_2O$) to +0.25 kPag (+1 inch of water), or ranges from −1.5 kPag (−6 inches $H_2O$) to −0.5 kPag (−2 inches $H_2O$), or ranges from −1 kPag (−4 inches $H_2O$) to −0.75 kPag (−3 inches $H_2O$); and
wherein the secondary operating mode further comprises passing the second quantity of the combustion product gas stream from the reformer furnace to the induced draft fan, where the induced draft fan is operated so that the pressure external to the plurality of catalyst-containing reformer tubes in the reformer furnace ranges from −2.5 kPag (−10 inches $H_2O$) to +0.25 kPag (+1 inch of water), or ranges from −1.5 kPag (−6 inches $H_2O$) to −0.5 kPag (−2 inches $H_2O$), or ranges from −1 kPag (−4 inches $H_2O$) to −0.75 kPag (−3 inches $H_2O$).

12. The process of claim 9 further comprising:
a tertiary operating mode, the tertiary operating mode commencing subsequent to the secondary operating mode, the tertiary operating mode performed when the exhaust stream from the gas turbine is unavailable, the tertiary operating mode comprising:

passing a third quantity of the oxidant stream from the forced draft fan to the heat exchanger thereby heating the third quantity of the oxidant stream from the forced draft fan in the heat exchanger;

partially closing the valve assembly and blending the third quantity of the oxidant stream from the draft fan, after being heated in the heat exchanger, with a second quantity of the draft air stream from the valve assembly to form a second quantity of the blended oxidant stream comprising draft air;

introducing a third quantity of the reformer feed gas stream into the plurality of catalyst-containing reformer tubes in the reformer furnace, reacting the third quantity of the reformer feed gas stream under reaction conditions effective to form a third quantity of the reformate stream comprising $H_2$, CO, $CH_4$, and $H_2O$, and withdrawing the third quantity of the reformate stream from the plurality of catalyst-containing reformer tubes of the reformer furnace; and combusting a third quantity of the fuel stream with at least a portion of the second quantity of the blended oxidant stream comprising draft air in the reformer furnace external to the plurality of catalyst-containing reformer tubes under conditions effective to combust the third quantity of the fuel stream to form a third quantity of the combustion product gas stream and generate heat to supply energy for reacting the third quantity of the reformer feed gas stream inside the plurality of catalyst-containing reformer tubes, and withdrawing the third quantity of the combustion product gas stream from the reformer furnace;

wherein the first quantity of the oxidant stream has a time-averaged mass flow rate, $F_1$;

wherein the second quantity of the oxidant stream has a time-averaged mass flow rate, $F_2$;

wherein the third quantity of the oxidant stream has a time-averaged mass flow rate, $F_3$, wherein the first quantity of the draft air stream has a time-averaged mass flow rate, $G_1$;

wherein the second quantity of the draft air stream has a time-averaged mass flow rate $G_2$ and wherein $F_3 > F_1$, $F_3 > F_2$, and $G_1 > G_2$.

13. The process of claim 9 wherein the primary operating mode further comprises:

passing a first quantity of a second oxidant stream from a second forced draft fan to a second heat exchanger thereby heating the first quantity of the second oxidant stream from the second forced draft fan in the second heat exchanger;

blending the first quantity of the second oxidant stream from the second forced draft fan, after being heated in the second heat exchanger, with a first quantity of a second portion of the exhaust stream from the gas turbine to form a first quantity of a second blended oxidant stream comprising gas turbine exhaust;

introducing a first quantity of a second reformer feed gas stream into a plurality of catalyst-containing reformer tubes in a second reformer furnace, reacting the first quantity of the second reformer feed gas stream in a reforming reaction under reaction conditions effective to form a first quantity of a second reformate stream comprising $H_2$, CO, $CH_4$, and $H_2O$, and withdrawing the first quantity of the second reformate stream from the plurality of catalyst-containing reformer tubes of the second reformer furnace; and combusting a first quantity of a second fuel stream with at least a portion of the first quantity of the second blended oxidant stream comprising gas turbine exhaust in the second reformer furnace external to the plurality of catalyst-containing reformer tubes of the second reformer furnace under conditions effective to combust the first quantity of the second fuel stream to form a first quantity of a second combustion product gas stream and generate heat to supply energy for reacting the first quantity of the second reformer feed gas stream inside the plurality of catalyst-containing reformer tubes of the second reformer, and withdrawing the first quantity of the second combustion product gas stream from the second reformer furnace;

and wherein the secondary operating mode further comprises:

passing a second quantity of the second oxidant stream from the second forced draft fan to the second heat exchanger thereby heating the second quantity of the second oxidant stream from the second forced draft fan in the second heat exchanger;

opening a second valve assembly and blending the second quantity of the second oxidant stream from the second forced draft fan, after being heated in the second heat exchanger, with a first quantity of a second draft air stream from the second valve assembly to form a first quantity of a second blended oxidant stream comprising draft air;

introducing a second quantity of the second reformer feed gas stream into the plurality of catalyst-containing reformer tubes in the second reformer furnace, reacting the second quantity of the second reformer feed gas stream under reaction conditions effective to form a second quantity of the second reformate stream comprising $H_2$, CO, $CH_4$, and $H_2O$, and withdrawing the second quantity of the second reformate stream from the plurality of catalyst-containing reformer tubes of the second reformer furnace; and combusting a second quantity of the second fuel stream with at least a portion of the first quantity of the second blended oxidant stream comprising draft air in the second reformer furnace external to the plurality of catalyst-containing reformer tubes of the second reformer under conditions effective to combust the second quantity of the second fuel stream to form a second quantity of the second combustion product gas stream and generate heat to supply energy for reacting the second quantity of the second reformer feed gas stream inside the plurality of catalyst-containing reformer tubes of the second reformer, and withdrawing the second quantity of the second combustion product gas stream from the second reformer furnace.

14. The process of claim 9 wherein at least one of the first quantity of the reformate stream, the second quantity of the reformate stream, and the third quantity of the reformate stream from the plurality of catalyst-containing reformer tubes of the reformer furnace is separated by pressure swing adsorption in a pressure swing adsorber to produce a $H_2$-containing product and a by-product gas, and wherein the first fuel stream comprises at least a portion of the by-product gas.

15. The process of claim 9 further comprising:

acquiring first pressure data of the blended oxidant stream comprising gas turbine exhaust during the primary operating mode;

acquiring second pressure data responsive to pressure in the reformer furnace external to the plurality of catalyst-containing reformer tubes during the primary operating mode;

acquiring oxygen concentration data for the combustion product gas stream during the primary operating mode;

opening and closing the valve assembly responsive to the first pressure data acquired during the primary operating mode, the second pressure data acquired during the primary operating mode, and the oxygen concentration data acquired during the primary operating mode;

adjusting the speed of the forced draft fan responsive to the first pressure data acquired during the primary operating mode, the second pressure data acquired during the primary operating mode, and the and the oxygen concentration data acquired during the primary operating mode; and adjusting the speed of an induced draft fan responsive to the first pressure data acquired during the primary operating mode, the second pressure data acquired during the primary operating mode, and the and the oxygen concentration data acquired during the primary operating mode.

16. The process of claim 9 further comprising:

acquiring first pressure data of the blended oxidant stream comprising draft air during the secondary operating mode;

acquiring second pressure data responsive to pressure in the reformer furnace external to the plurality of catalyst-containing reformer tubes during the secondary operating mode;

acquiring oxygen concentration data for the combustion product gas stream during the secondary operating mode;

opening and closing the valve assembly responsive to the first pressure data acquired during the secondary operating mode, the second pressure data acquired during the secondary operating mode, and the oxygen concentration data acquired during the secondary operating mode;

adjusting the speed of the forced draft fan responsive to the first pressure data acquired during the secondary operating mode, the second pressure data acquired during the secondary operating mode, and the and the oxygen concentration data acquired during the secondary operating mode; and adjusting the speed of the induced draft fan responsive to the first pressure data acquired during the secondary operating mode, the second pressure data acquired during the secondary operating mode, and the and the oxygen concentration data acquired during the secondary operating mode.

* * * * *